United States Patent [19]

Williams

[11] Patent Number: 4,593,929

[45] Date of Patent: Jun. 10, 1986

[54] WHEELCHAIR

[76] Inventor: Ronald H. Williams, 13564 Trinity, Detroit, Mich. 48223

[21] Appl. No.: 457,328

[22] Filed: Jan. 12, 1983

[51] Int. Cl.[4] .................. B62B 11/00

[52] U.S. Cl. .................. 280/650; 4/484; 16/DIG. 24; 280/289 WC; 280/289 S; 296/78 R; 297/392; 297/465; 297/466; 297/467; 297/DIG. 4; 305/17

[58] Field of Search ....... 280/647, 648, 650, 242 WC, 280/289 WC, 289 S; 296/91, 97 E, 97 R, 78 R, 120; 135/90, 96; 297/DIG. 4, 391, 392, 393, 465–467; 188/2 F; 305/17, 18, 19, 52; 16/112, 114 R, 123, DIG. 24; 4/452, 484, 480, 479

[56] References Cited

U.S. PATENT DOCUMENTS

| | | | |
|---|---|---|---|
| 396,862 | 1/1889 | Drew | 305/17 |
| 1,702,010 | 2/1929 | Klever | 296/20 |
| 2,566,046 | 8/1951 | Weinstein | 128/134 |
| 2,681,689 | 6/1954 | Breed | 280/242 WC |
| 3,142,351 | 7/1964 | Green | 297/DIG. 4 |
| 3,189,384 | 6/1965 | Bliss | 297/DIG. 4 |
| 3,468,188 | 9/1969 | MacCoon | 74/552 |
| 3,596,655 | 8/1971 | Corcoran | 297/391 |
| 3,611,457 | 10/1971 | Wippich | 4/484 |
| 3,901,527 | 8/1975 | Danziger | 280/650 |
| 3,922,034 | 11/1975 | Eggert | 297/391 |
| 3,964,786 | 6/1976 | Mashuda | 280/242 WC |
| 4,046,418 | 9/1977 | Smith | 297/DIG. 4 |
| 4,050,737 | 9/1977 | Jordan | 297/465 |
| 4,079,990 | 3/1978 | McMunn | 297/DIG. 4 |
| 4,165,354 | 8/1979 | Rodaway | 297/DIG. 4 |
| 4,229,039 | 10/1980 | Day | 297/DIG. 4 |
| 4,343,299 | 8/1982 | Oxendine | 128/134 |
| 4,343,482 | 8/1982 | Wegner | 280/650 |
| 4,366,964 | 1/1983 | Farey | 280/242 WC |
| 4,389,057 | 6/1983 | Richard | 297/DIG. 4 |

FOREIGN PATENT DOCUMENTS

| | | | |
|---|---|---|---|
| 1243032 | 8/1971 | United Kingdom | 188/2 F |

*Primary Examiner*—John J. Love
*Assistant Examiner*—Joseph G. McCarthy
*Attorney, Agent, or Firm*—Remy J. VanOphem

[57] ABSTRACT

The vehicle has a pair of spaced apart side frames disposed and spaced apart in parallel relationship. Each of the side frames is provided with a caster wheel and a drive wheel. A seat base assembly is provided above the frame assemblies and is movably interconnected on each side with one of the frame assemblies. A seat back assembly, having an upper end and a lower end, is pivotally and adjustably interconnected at its lower end to each of the side frames. In a preferred embodiment, the transport vehicle is collapsible for storage and has a removable seat base insert, adjustable and removable leg rests and arm rests, a head restraint, a torso restraint, a sun visor, and a removable enclosure for inclement weather.

35 Claims, 87 Drawing Figures

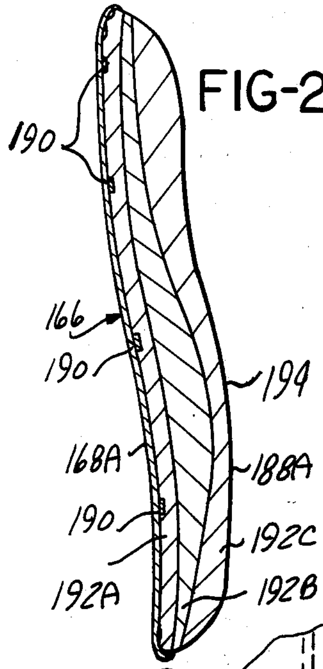
FIG-20
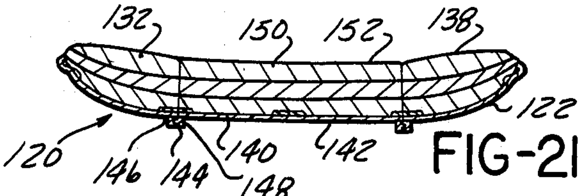
FIG-21
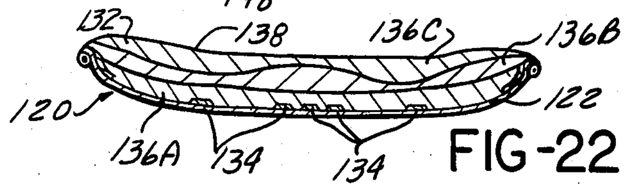
FIG-22
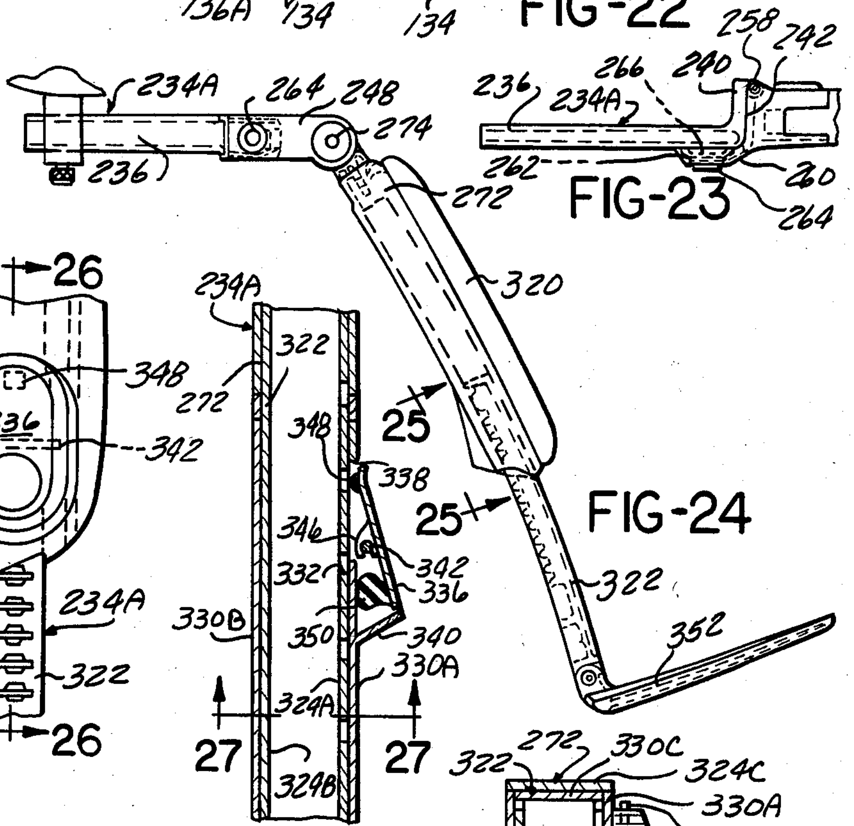
FIG-23
FIG-24
FIG-26
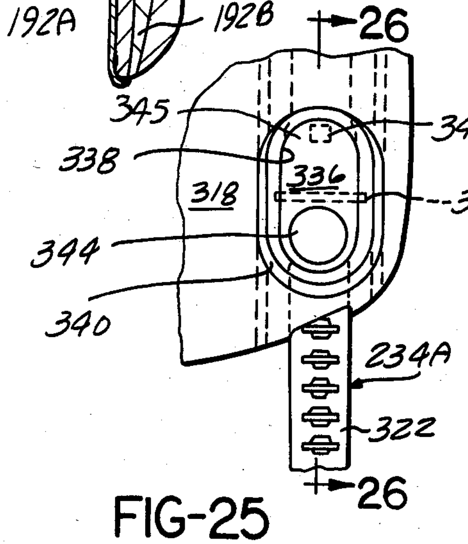
FIG-25
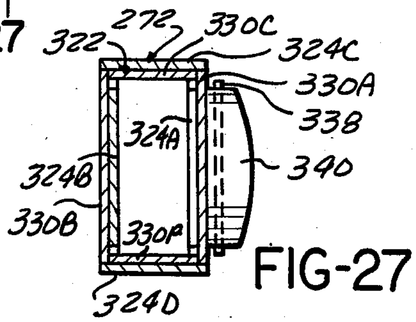
FIG-27
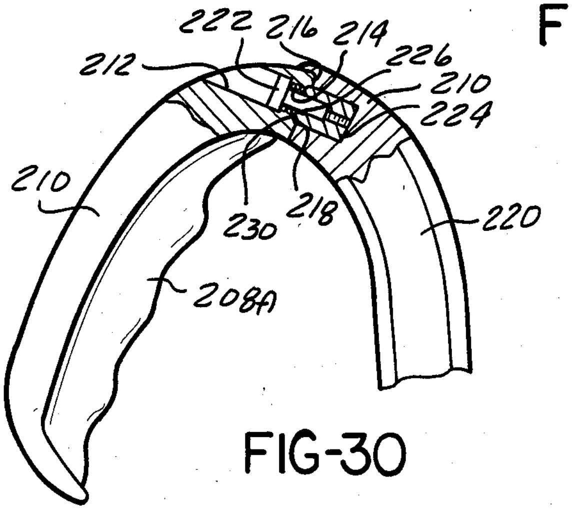
FIG-30
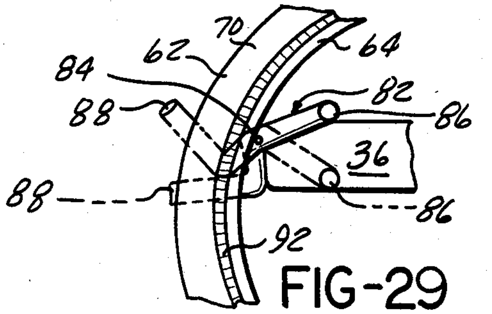
FIG-29

WHEELCHAIR

BACKGROUND OF THE PRESENT INVENTION

The present invention relates to wheeled transport vehicles and, more particularly, relates to improvements in wheelchairs, stretchers, and patient handlers and similar vehicles for transporting handicapped individuals.

Many individuals are disabled, either permanently or temporarily, and must rely on wheeled transport vehicles to get from place to place. The needs of the physically disabled are generally no different from those of able-bodied individuals. They must be able to get from place to place in a reasonable time period. They must be able to easily and comfortably take care of bodily functions. They must be physically comfortable or they may tire more rapidly than would otherwise be the case. Furthermore, the individuals who use wheelchairs often have specialized needs. For example, some occupants may require extra devices to hold them in the wheelchair, or they may require a wheelchair with removable arm rests so that they may easily alight or board the wheelchair.

A number of transport vehicles for the handicapped have been suggested in the past, and many are in common use today. Most wheelchairs used today have a tubular frame with one or more sheets of canvas stretched across the frame to form a seat. Small caster wheels are mounted to the front portion of the wheelchair. Large wheels having handgrips are mounted to the rear portion of the wheelchairs. Such wheelchairs may be rigidly constructed or may be collapsible. They may be operated manually by an attendant who manipulates the wheelchair by handles formed integrally with the tubular frame, or by the occupant by rotation of the large wheels. Alternatively, they may be operated by either the attendant or the occupant through the use of a power drive unit. Such wheelchairs have become very popular because they are comparatively lightweight and however, such wheelchairs have many disadvantages. The arm rests are usually not adjustable or removable. The leg rests, if any, are usually neither removable nor adjustable. A head rest is usually not provided. The wheelbase of such wheelchairs is not adjustable to the size of the occupant. Occupants needing special restraints must be secured to the wheelchair by uncomfortable and embarrassing seatbelts and shoulder harnesses. The seat back is not adjustable. Finally, such wheelchairs are usually less comfortable than the average household chair. Examples of collapsible wheelchairs of this type are disclosed in U.S. Pat. No. 2,810,429 (issued Oct. 22, 1957) and U.S. Pat. No. 2,847,058 (issued Aug. 12, 1958).

Many serious attempts have been made at constructing wheelchairs which are either more comfortable or more adaptable to the size and needs of the occupant.

U.S. Pat. No. 3,767,260 (Oct. 23, 1973) describes a wheelchair having an adjustable arm rest. The arm rest is retractable horizontally to facilitate ingress and egress and also to facilitate the positioning of the wheelchair relative to a table or desk or the like. The arm rest is not completely removable and does not retract far enough to permit the occupant to move directly to the side from the wheelchair without moving forward a short distance.

U.S. Pat. No. 3,261,031 (issued July 19, 1966) describes a wheeled patient handler having a seat with a removable insert portion. The wheelchair may be backed over a water closet and the insert removed when the occupant needs to utilize the water closet. The patient handler described also is adjustable between several upright seating positions and a stretcher position. The arm rests of the patient handler folds out of the way automatically when the patient handler is placed in its fully reclined or stretcher orientation. The handles are not removable or adjustable when the wheelchair is in its seating position. No provision is made for removal of the arm rests or the leg rests or for adjustment of the wheelbase of the vehicle. Furthermore, the leg rests may not be adjusted independently of the seat back. Finally, the patient handler disclosed is neither collapsible nor lightweight.

Other wheelchairs have been proposed providing adjustability of the seat back and the leg rests. Examples of such wheelchairs may be found in U.S. Pat. Nos. 4,046,418 (issued Sept. 6, 1977), 4,082,348 (issued Apr. 4, 1978), and U.S. Pat. No. 4,033,624 (issued July 5, 1977). While these wheelchairs provide additional adjustments and weigh less than the one described immediately above, they do not provide for the full range of adjustments needed for the comfort and convenience of the occupant.

Several wheelchairs have been proposed which emphasize styling and comfort. For example, a comfortable, cushioned wheelchair is disclosed in U.S. Pat. No. 3,896,891 (issued July 29, 1975). The wheelchair disclosed is a motorized wheelchair which can be easily disassembled into separate components for storage or transport. U.S. Pat. No. 4,268,054 (issued May 19, 1981) describes another attempt at a comfortable and attractive wheelchair. The wheelchair disclosed therein has a tubular frame construction but is provided with a molded, one-piece, contoured plastic seat.

The above-described wheelchairs provide a choice for the user between comfort, adjustability, appearance or weight. None of the above wheelchairs combine the advantages of lightweight construction with adjustability, comfort, and modular construction.

The present invention provides an attractive wheelchair, which is adjustable to the size and shape of the occupant. The wheelchair of the present invention is adaptable to changing needs. The wheelchair of the present invention provides restraint devices which are less embarrassing and more comfortable for the occupant. Furthermore, the wheelchair of the present invention provides several unique comfort and convenience features which solve problems which have not been considered previously.

The users of wheelchairs are moving more and more into the mainstream of American life. Federal and state laws requiring handicapped access, and government programs to create job opportunities for handicapped individuals have meant that more and more handicapped individuals are traveling without attendants. Since they are traveling without attendants, they need to be better protected against the elements. They need a convenient means to protect their eyes from the glaring sun. While sunglasses may be used, even able-bodied individuals have difficulty at times with sunglasses falling off. For a handicapped individual, the sunglasses may fall off and out of reach. Furthermore, in the case of some handicapped individuals, the effort and manipulation required to put on sunglasses is too great.

Another hazard to handicapped individuals, with or without attendants, is wind and rain. Mild wind may stir up dirt and blow the dirt at the face of the occupant of the wheelchair. The occupant may or may not be able to temporarily shield his eyes from the wind. But without an attendant, the occupant cannot shield his eyes and propel the vehicle at the same time. When it is raining or snowing, an umbrella would be difficult or impossible for the occupant of the wheelchair to use, depending on his handicap. Furthermore, an umbrella is not sufficient to protect the occupant from the rain.

To address these needs of wheelchair occupants, the wheelchair of the present invention is provided with an easily operable sun visor for protecting the occupant of the wheelchair from wind and the sun. The wheelchair of the present invention is further provided with a collapsible and removable enclosure to protect the occupant from extreme wind, and from rain and snow.

SUMMARY OF THE INVENTION

The present invention provides an attractive, lightweight, and adjustable wheelchair of modular construction.

The present invention includes a wheelchair having a frame assembly constructed of strong, lightweight material. A pair of caster assemblies are interconnected in spaced relationship to the front of the frame. A pair of larger hand operable wheels are also interconnected with the frame assembly, one behind each of the caster assemblies. A seat base assembly is fastened to the frame assembly. A seat back assembly is adjustably fastened to the main frame assembly.

The main frame assembly consists of two side frames in a spaced apart and parallel relationship. The side frames may be interconnected by a collapsing mechanism to permit the side frames to be brought together when the wheelchair is not in use. The seat base assembly may be pivotally fastened to one of the side frames and removably fastened to the other of the side frames so that the seat may be pivoted upwardly and away from the main frame when the main frame is folded. The seat back assembly may consist of two seat back frames hingedly fastened to each other. Each of the seat back frames is pivotally fastened to one of the side frames. Therefore, when the wheelchair is to be folded, the two seat back frames fold together.

Alternatively, the main frame may consist of a single U-shaped member having two arms and a base interconnecting the two arms. The casters are pivotally mounted to the base of the main frame and the large wheels are mounted to the ends of the arms. The seat base assembly is rigidly interconnected with the main frame.

The wheelchair of the present invention further provides a removable insert in the seat base assembly. A portable toilet is provided which is removably insertable in the seat base assembly in place of the insert. Alternatively, the wheelchair of the present invention may be backed over a water closet for use by the occupant when the insert is removed. A disposable liner is also provided to protect the wheelchair.

The wheelchair of the present invention further is provided with an adjustable wheel mounting assembly operably disposed between each of the large wheels and the main frame assembly. A track having a gear rack is rigidly interconnected with the main frame. A wheel mounting frame is movably interconnected with the track and slides therealong. A manually operable gear assembly is provided having a gear meshing with the rack, whereby the location of the wheel mounting frame along the rack may be adjusted. The large wheel is mounted to the wheel mounting frame.

The wheelchair of the present invention may be provided with a novel spokeless wheel assembly. A wheel hub is rigidly fastened to the side frame or, when an adjustable wheelbase is provided, to the wheel mounting frame. The hub is provided with a circumferentially disposed channel. A series of roller bearings are provided in the channel. A second rim rides in the channel on the roller bearings. The tire is fitted into the second rim to complete the wheel.

The wheelchair of the present invention has a head rest which may be rigidly or adjustably interconnected with the seat back assembly. One or more head restraint members may be pivotally fastened to the head rest. Alternatively, a bowl-shaped sun visor may be pivotally fastened to the head rest.

The wheelchair of the present invention is further provided with a vest for restraining the individual to the chair. The vest has a torso portion which is wrapped around the torso of the occupant of the wheelchair. Fasteners are provided at the front of the torso portion of the vest. At least one belt is fastened at both of its ends to the seat back assembly and extends therebetween through the torso portion of the vest to secure the vest to the seat back assembly. Four shoulder straps extend upwardly from the torso portion of the vest and are fastened in pairs over the shoulders of the occupant of the wheelchair.

The wheelchair of the present invention is also provided with a restraint brief for restraining the individual in the chair in a manner similar to the vest or, alternatively, with a belt-type waist and leg restraint.

The wheelchair of the present invention also features a collapsible enclosure to protect the occupant from exposure to the environment. The enclosure has two wheel covers, each fastened to the side frame over opposite wheels. A collapsible cover support frame extends between the wheel covers. A cover is stretched over the cover support frame. A second collapsible enclosure is provided for use with the wheelchair in its stretcher position.

In addition, the wheelchair of the present invention may be provided with adjustable and removable leg rests, adjustable and removable arm rests, and adjustable and removable handles.

The object of the present invention is to provide an attractive, comfortable, adjustable, and lightweight wheelchair. Such a wheelchair may be made in a collapsible form or in a noncollapsible form.

Another object of the present invention is to provide a comfortable wheelchair which is adjustable to the shape and size of the occupant. This object is achieved by providing an adjustable seat back, an adjustable and removable leg rest, an adjustable and removable arm rest, an adjustable wheelbase, and an adjustable handle.

Another object of the present invention is to provide a wheelchair having a comfortable device for restraining the individual to the chair. This object is achieved by providing a comfortable vest or a hidden belt or brief to restrain the occupant. This object is also achieved by providing a head restraint for the occupant.

Still another object of the present invention is to provide a wheelchair having easily operable features for protecting the occupant of the wheelchair from the environment. This object is achieved by providing a pivotable sun visor and by providing a removable wheelchair enclosure.

Still another object of the present invention is to provide a wheelchair having a safe and effective brake mechanism. This object is achieved by providing a brake mechanism which is operable to move between three positions. In one position, the brake mechanism permits free rotation of the wheels of the wheelchair. In the second position, the brake mechanism inhibits the rotation of the wheels by frictional engagement with the wheel. In the third position, the brake mechanism prohibits rotation by positive engagement with abutments on the wheel.

Yet another object of the present invention is to provide a wheelchair of modular construction which may be easily modified, as needed This object is achieved by using removable leg rests, arm rests, rests and handles, by providing optional head rests using either the sun visor or the head restraint for occasional use. This object is further realized by providing a removable seat insert and a removable toilet insert.

These and other objects, features, and advantages of the present invention will become apparent to one skilled in the art when the following detailed description is read in conjunction with the drawings appended hereto.

BRIEF DESCRIPTION OF THE DRAWINGS

FIG. 20 is a sectional view of the seat back assembly of the wheelchair of FIG. 1 taken along the lines 20—20 of FIG. 5B;

FIGS. 21 and 22 are sectional views of the seat base assembly of the wheelchair of FIG. 1 taken, respectively, along lines 21—21, and 22—22 of FIG. 5B;

FIG. 23 is a partial top view of a portion of one of the foot and leg rest assemblies of the wheelchair of FIG. 1;

FIG. 24 is a side view thereof;

FIG. 25 is a sectional view taken along lines 25—25 of FIG. 24;

FIG. 26 is a sectional view taken along lines 26—26 of FIG. 25;

FIG. 27 is a sectional view taken along lines 27—27 of FIG. 26;

FIG. 29 is a side view of a portion of the wheel assembly of the wheelchair of FIG. 1, illustrating the brake thereof, and the deceleration position in solid line, and in the locked position in phantom line;

FIG. 30 is a partly cut-away side view of one of the handles of one of the seat back assemblies of the wheelchair of FIG. 1;

Figure 1:
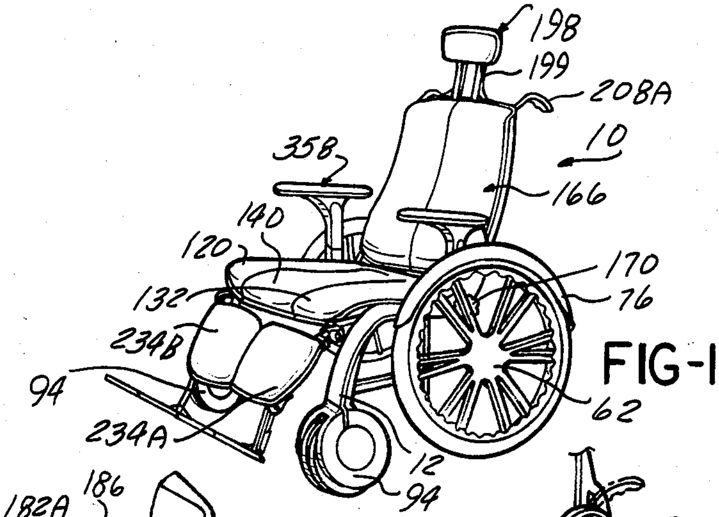
FIG. 1 is a front perspective view of an example of the wheelchair according to the present invention, the wheelchair being illustrated in a fully upright and opened position.
Figure 8:
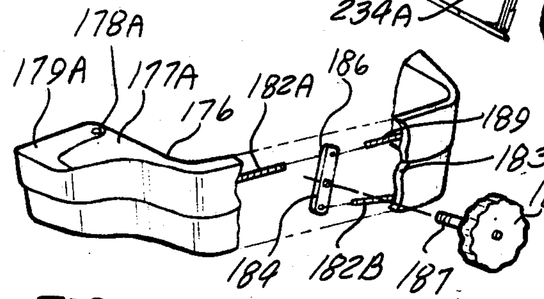
FIG. 8 is a partially schematic and partly exploded partial perspective view of the hinge assembly for the seat back of the wheelchair of FIG. 1.
Figure 63B:
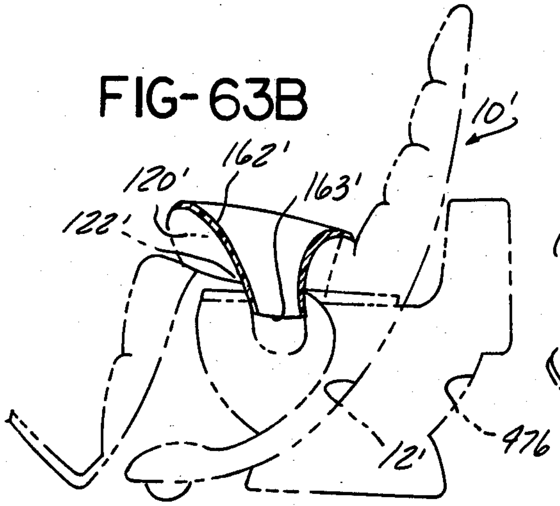
Figure 38:
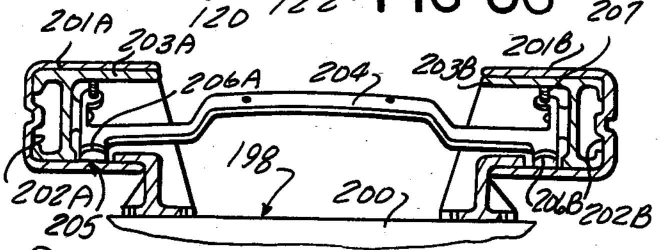
FIG. 38 is a sectional view taken along lines 38—38 of FIG. 37.
Figure 44:
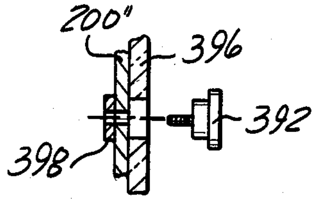
Figure 43:
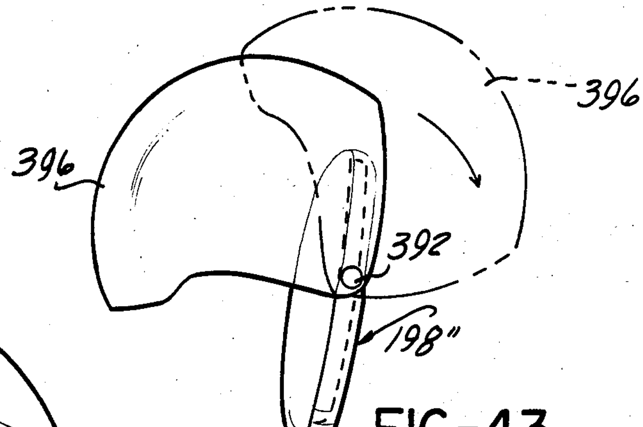
FIGS. 42 and 43 are, respectively, a front perspective and side elevational view of the sun visor of the wheelchair of FIG. 1, the sun visor being illustrated in phantom line and raised in a non-operating position in FIG.
Figure 42:
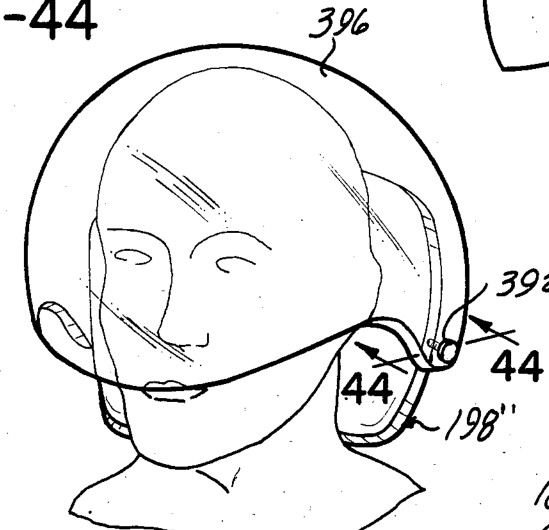
Figure 46:
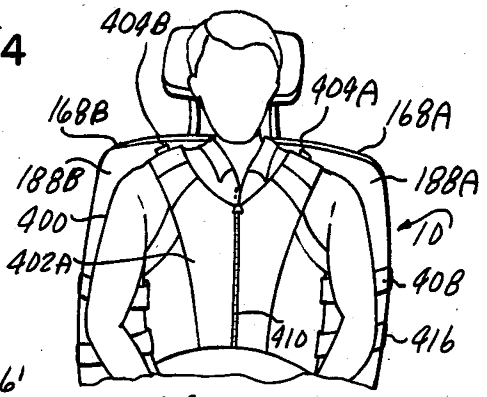
Figure 49:
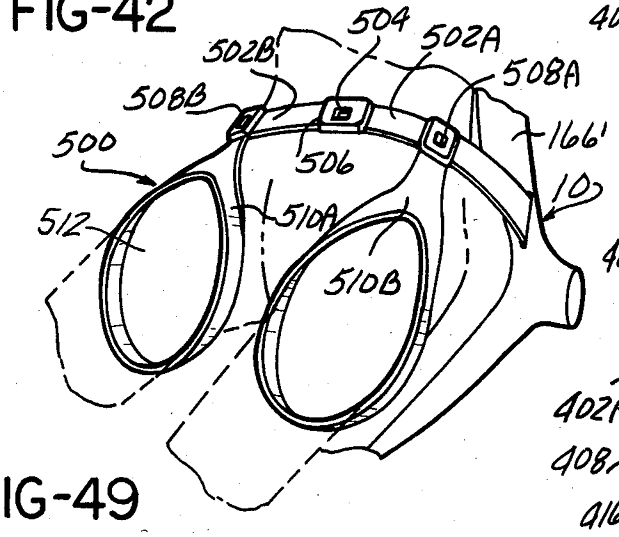
Figure 45:
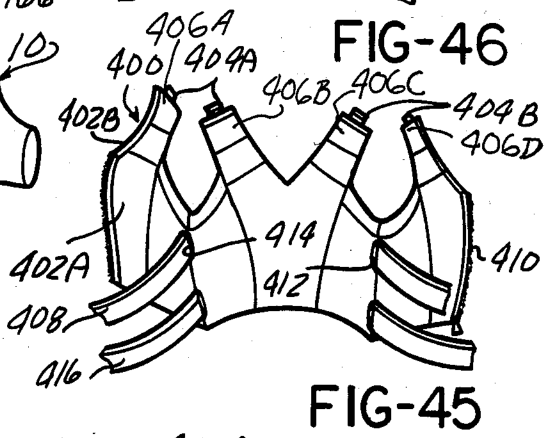
Figure 48:
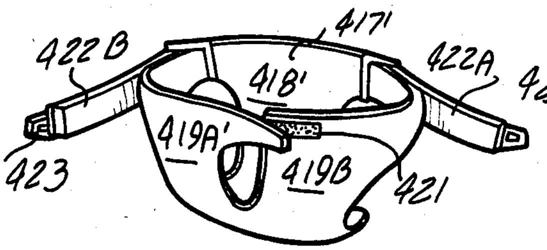
Figure 47:
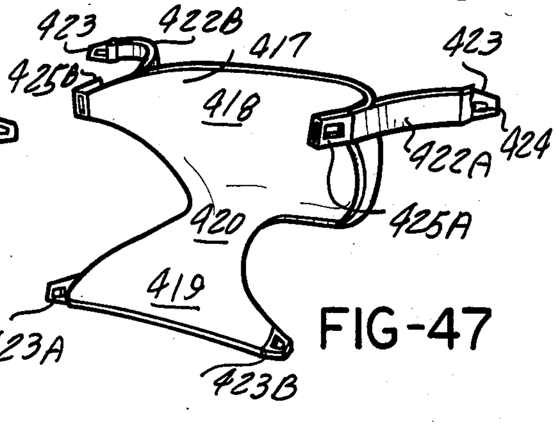
Figure 50:
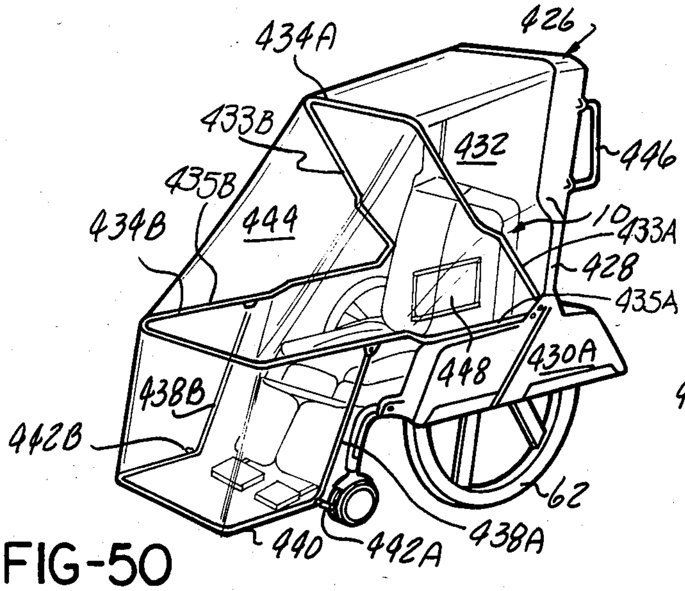
Figure 52:
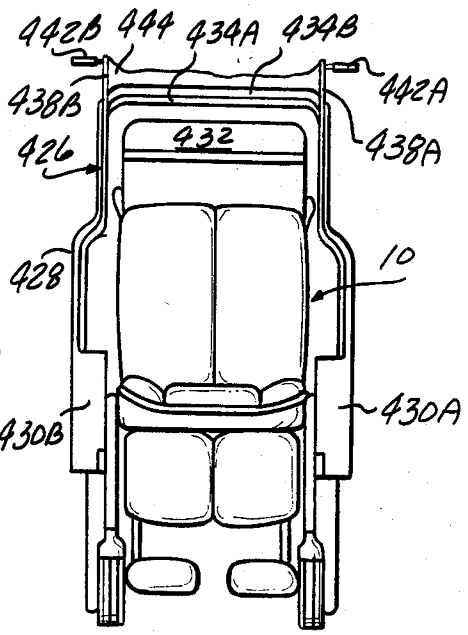
Figure 51A:
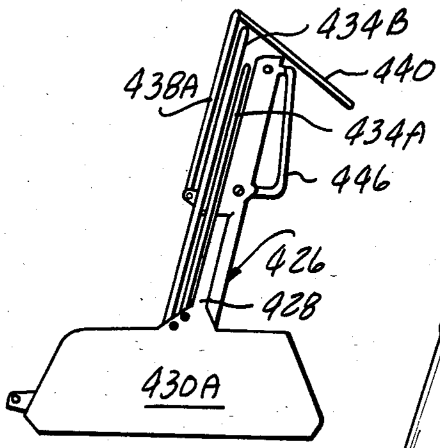
Figure 51B:
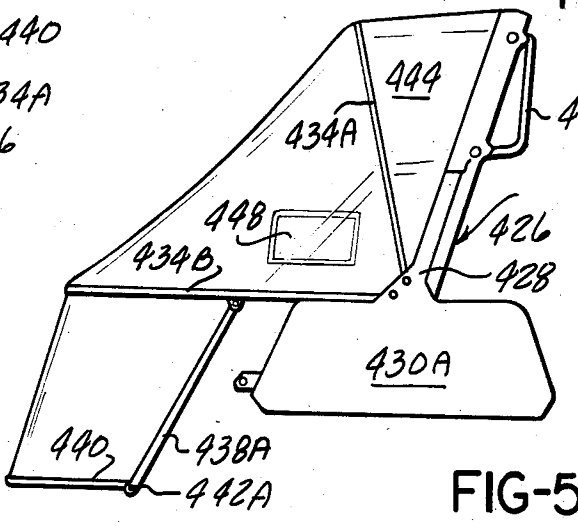
Figure 53:
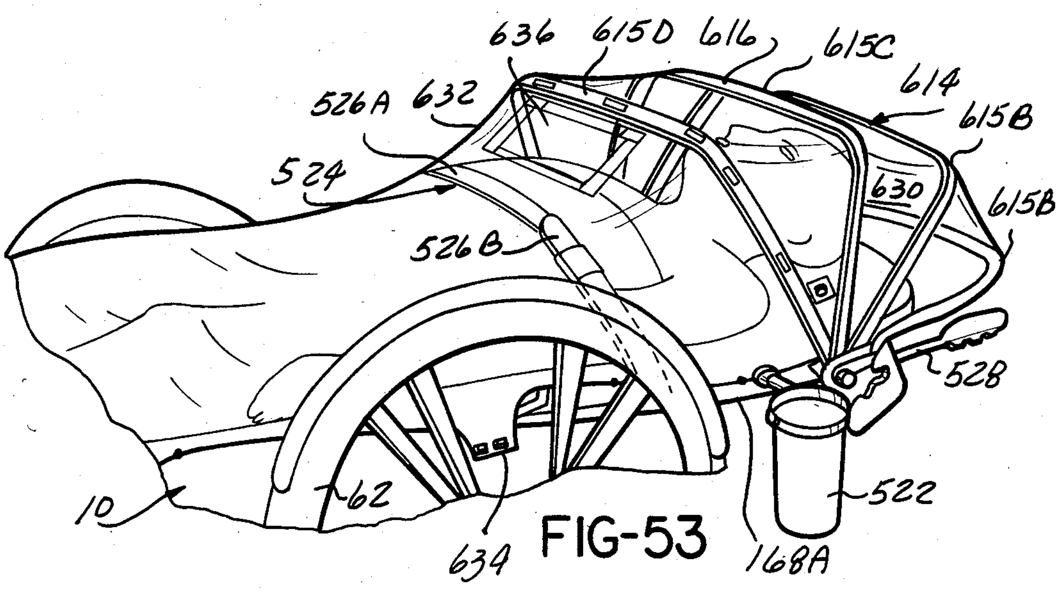
Figure 54A:
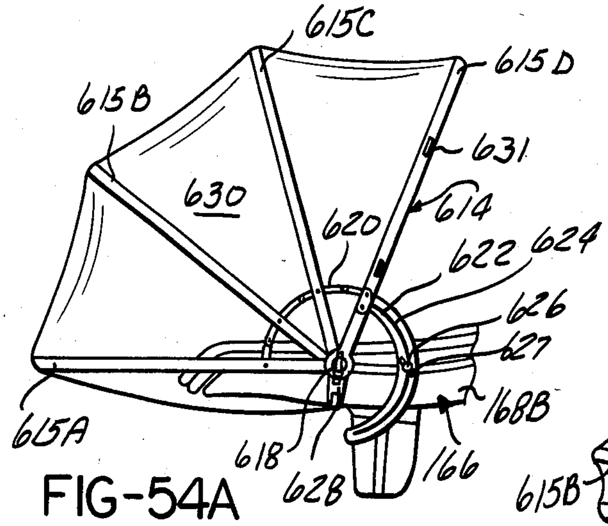
Figure 54B:
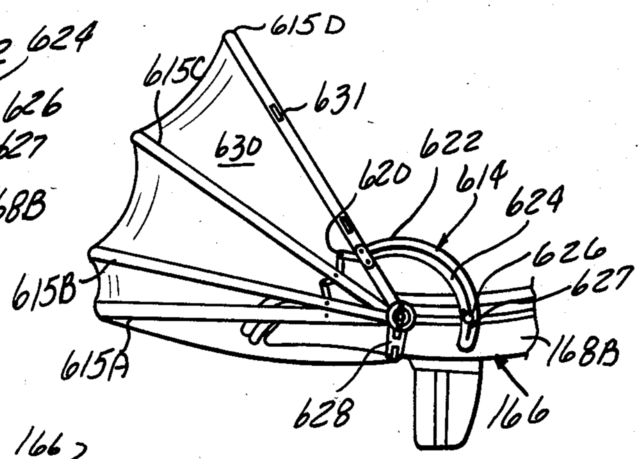
Figure 55:
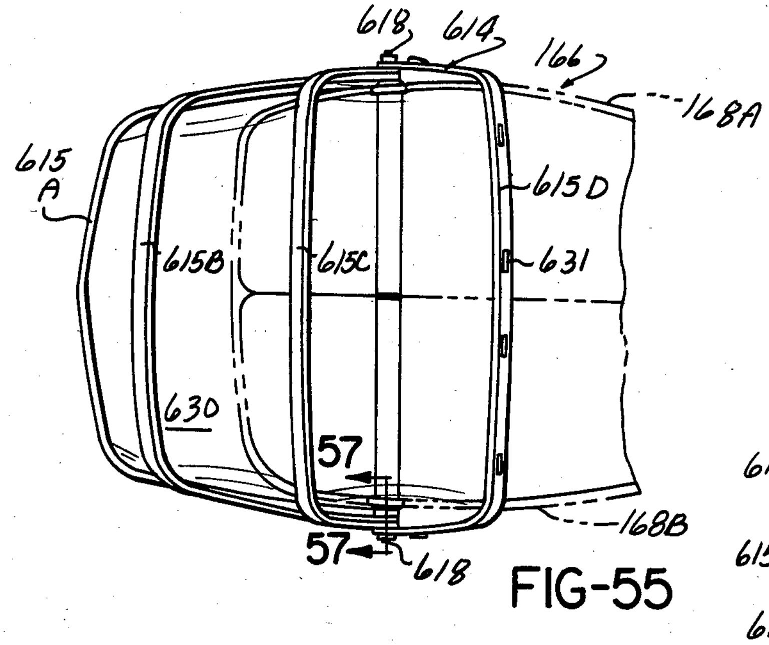
Figure 57:
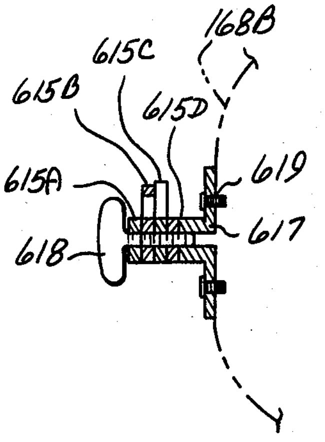
Figure 56:
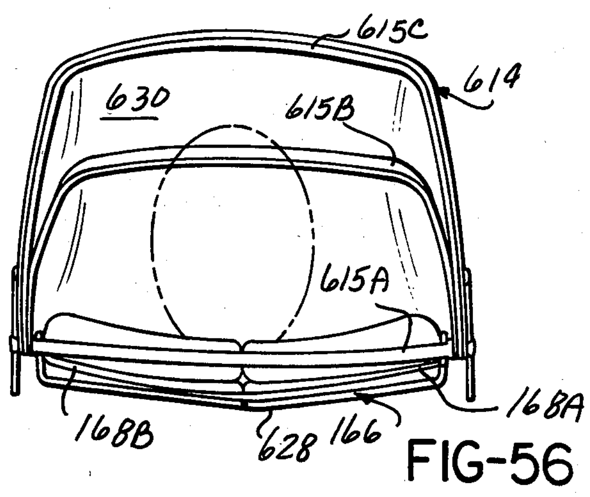
Figure 58:
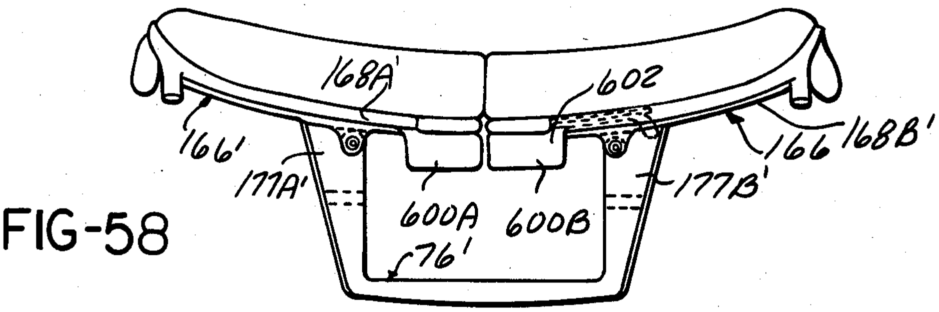
Figure 59:
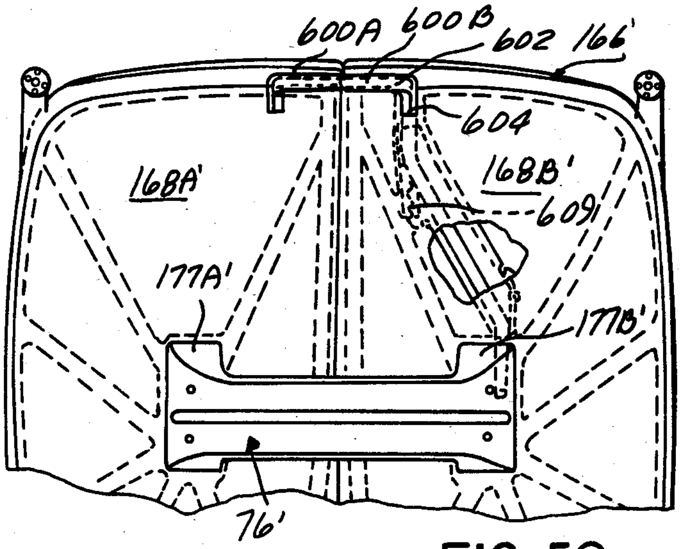
Figure 60:
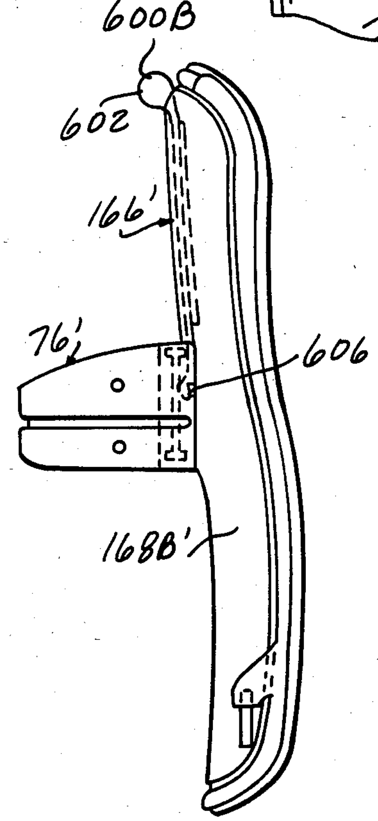
Figure 61:
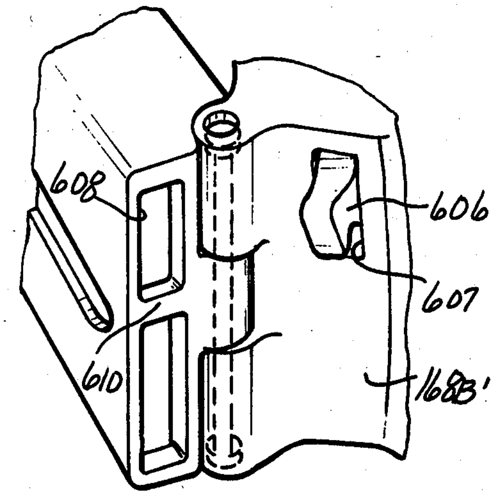
Figure 72:
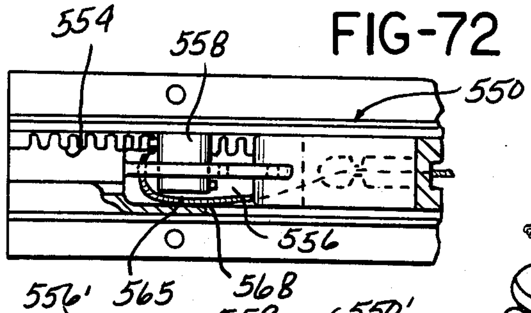
Figure 71:
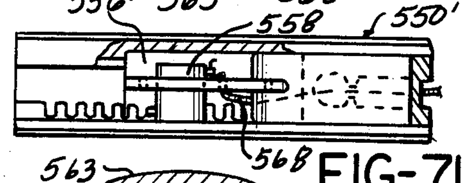
Figure 73:
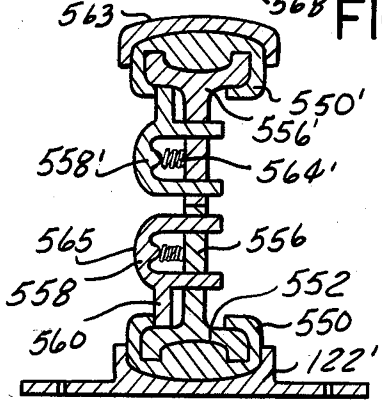
Figure 62:
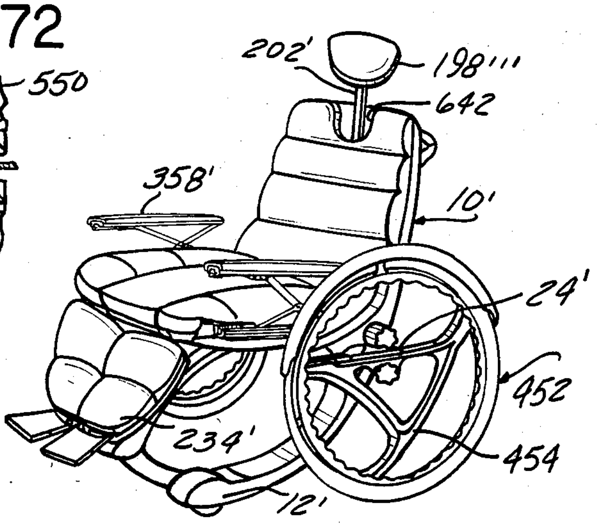
Figure 63A:
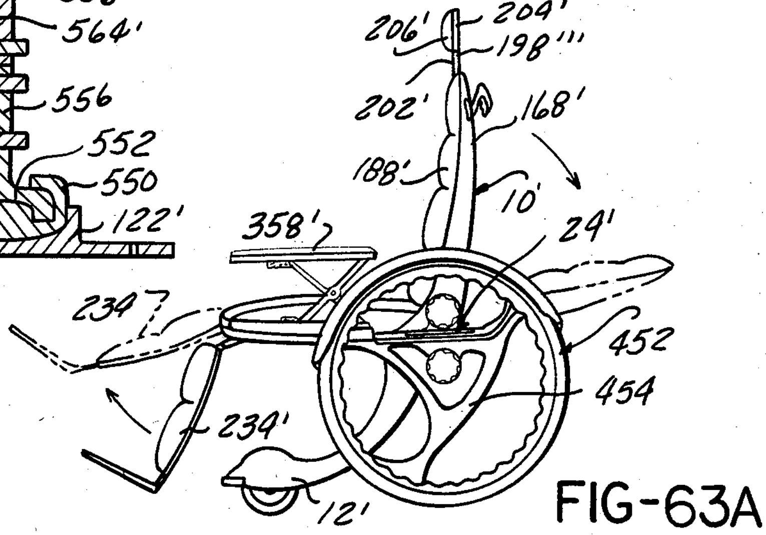
Figure 64:
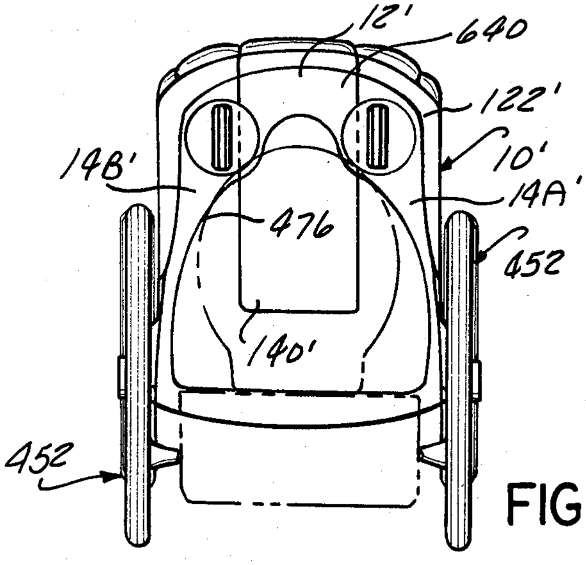
Figure 65:
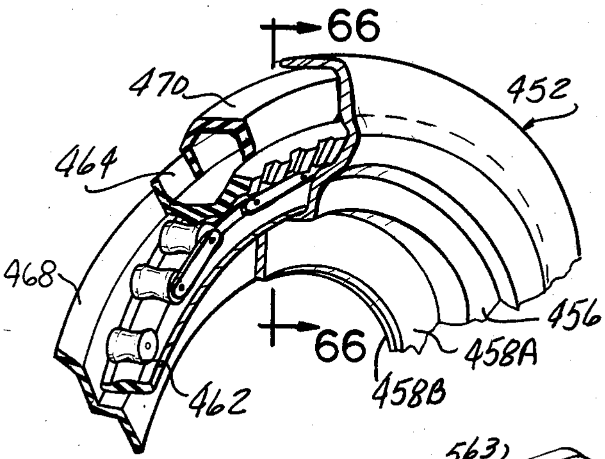
Figure 66:
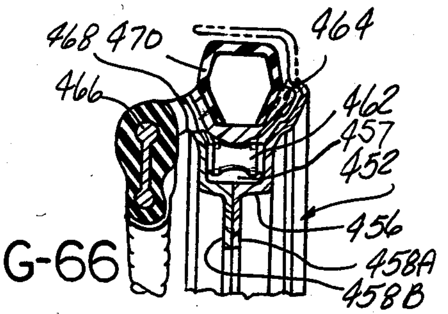
Figure 70B:
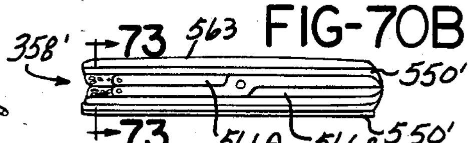
Figure 69:
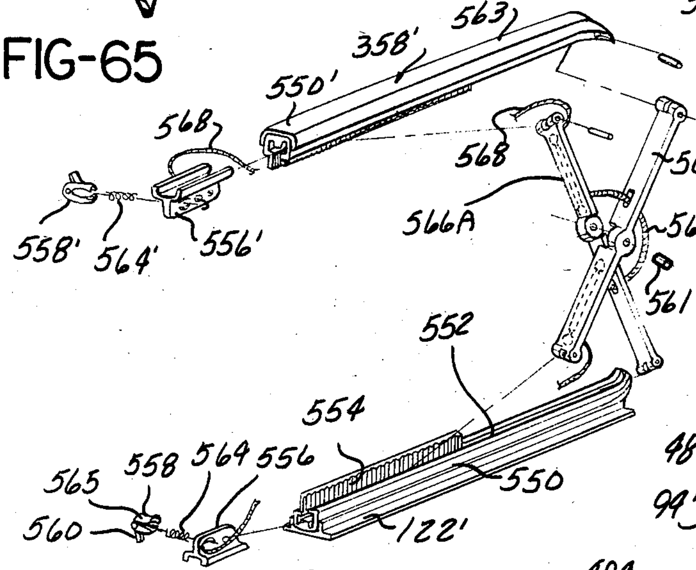
Figure 70A:
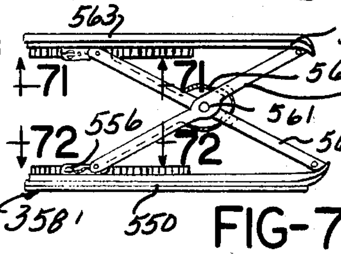
Figure 68:
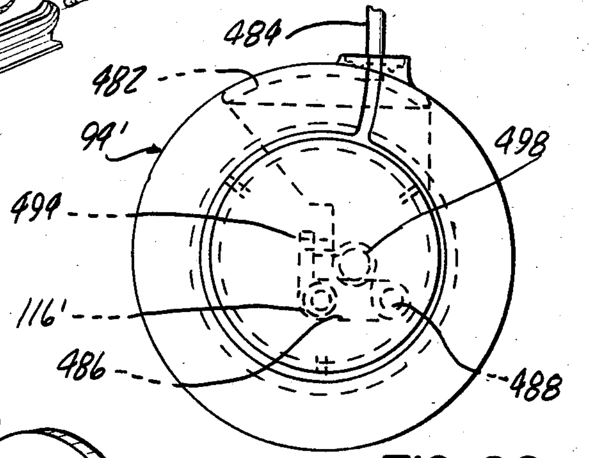
Figure 67:
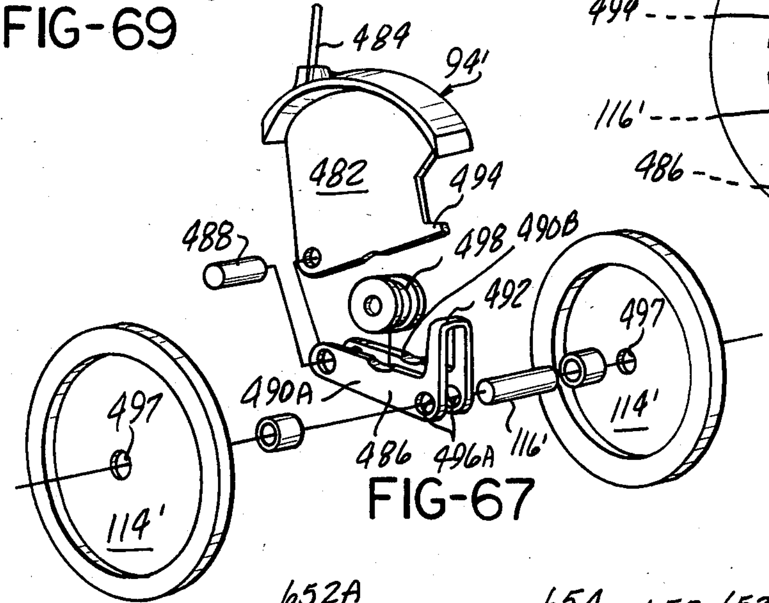
Figure 75A:
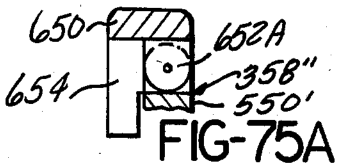
Figure 75B:
Figure 74:
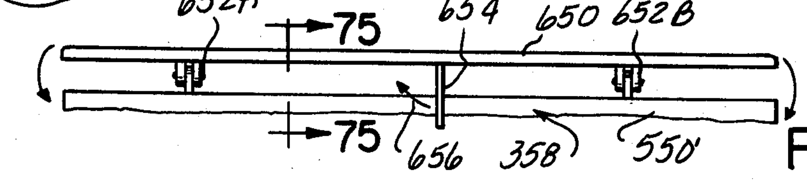
Figure 76:
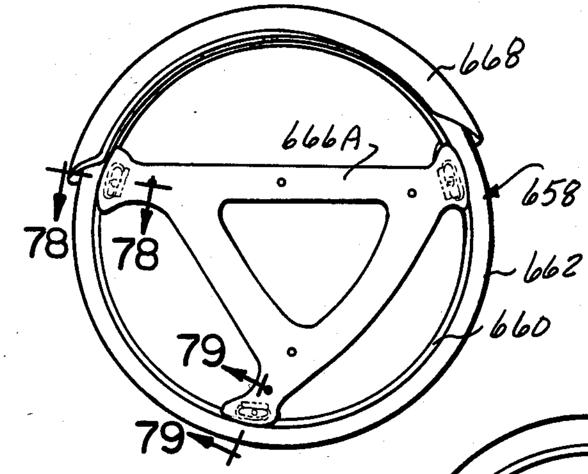
Figure 77:
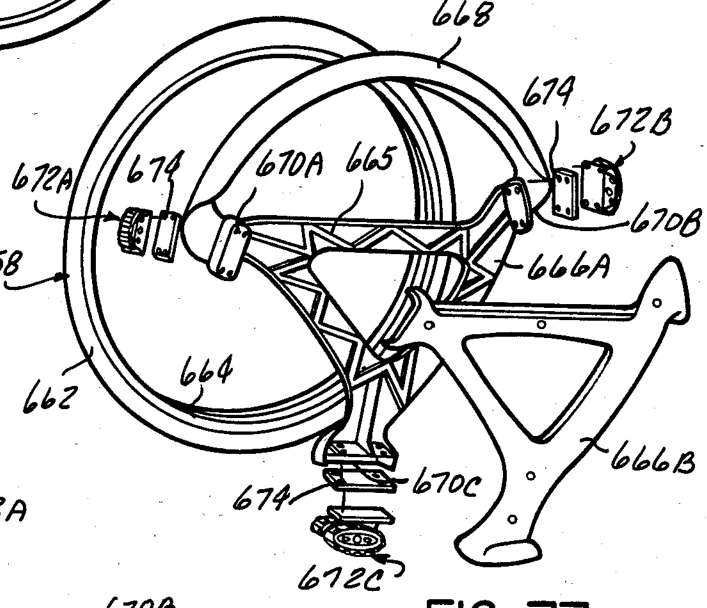

43 and in solid line and lowered in operating position, in FIGS. 42 and 43;

FIG. 44 is a sectional view taken along lines 44—44 of FIG. 42;

FIG. 45 is a perspective rear view of the restraint vest interconnected with the wheelchair of FIG. 1, and shows the vest in an opened condition;

FIG. 46 is a fragmentary front view of the vest of FIG. 45 in a closed condition on an occupant of the wheelchair of FIG. 1;

FIG. 47 is a perspective view of the restraint brief for use with the wheelchair of FIG. 1 and shows the brief in an opened condition;

FIG. 48 is a fragmentary front view of a similar restraint brief to that of FIG. 47, illustrated in a closed condition;

FIG. 49 is a fragmentary front view of a seat restraint belt in a closed condition on an occupant of the wheelchair of FIG. 1;

FIG. 50 is a perspective view of the wheelchair of FIG. 1 and a cover assembly therefor, the cover assembly being shown in its fully closed position;

FIGS. 51A and 51B are partial side views of the cover assembly of FIG. 50 and illustrate, respectively, the cover assembly in a fully opened position and in a fully closed position;

FIG. 52 is a front view of the wheelchair and cover assembly of FIG. 50 and illustrates the cover assembly in a fully opened position;

FIG. 53 is a partial perspective view of the wheelchair of FIG. 1 in a stretcher position and a cover assembly therefor, the cover assembly being in its fully closed position;

FIGS. 54A and 54B are partial side views of the head covering portion of the cover assembly of FIG. 53 and illustrate, respectively, the cover assembly in a fully closed position and a partially opened position;

FIGS. 55 and 56 illustrate top and front views, respectively, thereof;

FIG. 57 is a sectional view taken along lines 57—57 of FIG. 55;

FIGS. 58, 59 and 60 are, respectively, partial top, rear, and side views of the seat back assembly of the wheelchair of FIG. 1, but illustrate an alternate hinge mechanism therefor;

FIG. 61 is a partial perspective view illustrating a portion of the alternate hinge of FIGS. 58 through 60;

FIG. 62 is a perspective view of another example of the wheelchair according to the present invention, the wheelchair being illustrated in a fully upright position;

FIG. 63A is a side view of the wheelchair of FIG. 62 illustrating in solid line the seat back thereof in the fully upright position, and the leg rest thereof in the fully lowered position and, furthermore, illustrating in phantom line the seat back thereof in the fully lowered position and a leg rest thereof in the fully raised position;

FIG. 63B is a schematic side view of the wheelchair of FIG. 62 and a water closet, the wheelchair being rolled over the bowl of the water closet;

FIG. 64 is a bottom view of the wheelchair of FIG. 62 and further illustrates, in phantom line, a water closet;

FIG. 65 is a partially cut-away perspective view of a portion of the wheel assembly of the wheelchair of FIG. 62;

FIG. 66 is a sectional view taken along lines 66—66 of FIG. 65;

FIG. 67 is an exploded perspective view of the caster of the wheelchair of FIG. 62;

FIG. 68 is a side view thereof;

FIG. 69 is an exploded perspective view of the arm rest assembly of the wheelchair assembly of FIG. 62;

FIGS. 70A and 70B are side views thereof shown, respectively, in an opened and a closed position;

FIGS. 71 and 72 are sectional views taken, respectively, along lines 71—71 and along lines 72—72 of FIG. 70A;

FIG. 73 is a sectional view taken along lines 73—73 of FIG. 70B;

FIG. 74 is a partial view of the upper portion of an alternate arm rest assembly having a pivotal arm pad;

FIGS. 75A and 75B are sectional views taken along lines 75—75 of FIG. 74, in alternate orientations in the arm rest pad;

FIG. 76 is a side elevational view of an alternate spokeless wheel assembly of the wheelchairs of FIG. 1 or FIG. 62;

FIG. 77 is an exploded view thereof; and

Figure 78:
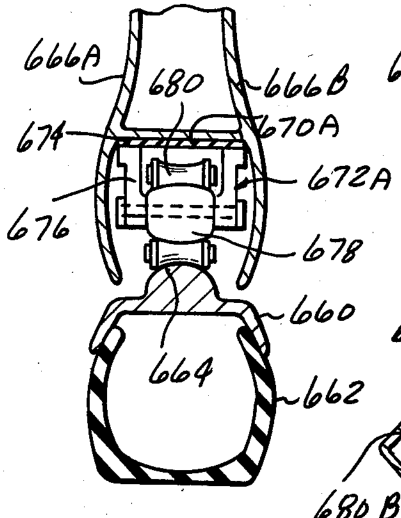
Figure 79:
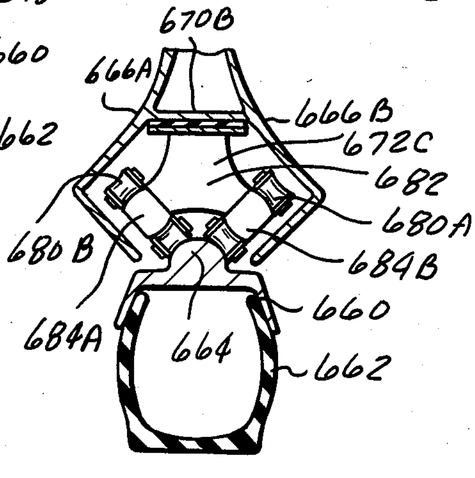

FIGS. 78 and 79 are sectional views taken respectively along lines 78—78 and 79—79 of FIG. 76.

DETAILED DESCRIPTION OF THE PREFERRED EMBODIMENT

Figure 3:
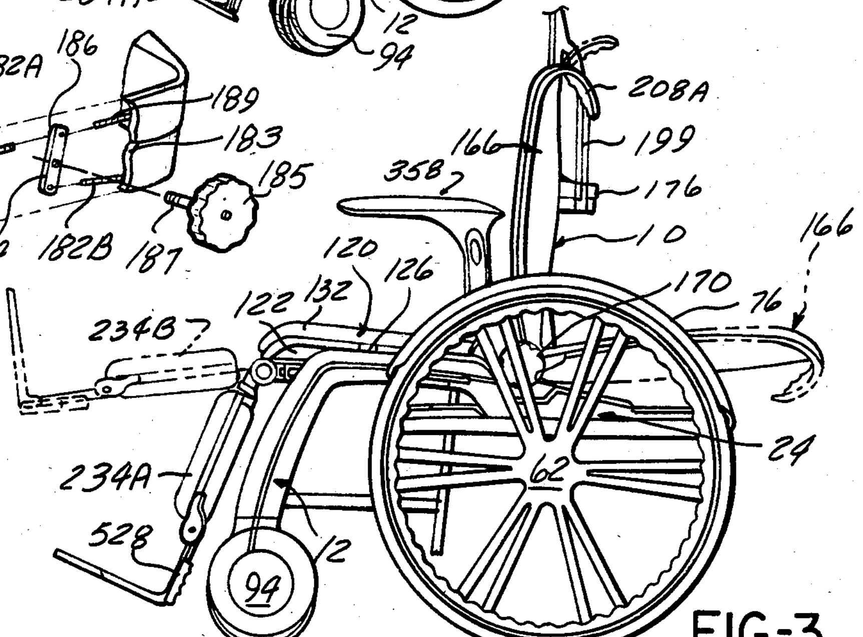
FIG. 3 is a side view of the wheelchair of FIG. 1 in a fully opened position with the seat back thereof in a fully upright position and the leg rests thereof in a fully lowered position, the fully lowered position of the seat back and the fully upright position of the leg rests thereof being illustrated in phantom line.

Referring now to FIGS. 1 through 79, a first example of a wheelchair 10 according to the present invention is illustrated. The wheelchair 10 of the present invention is of modular construction and, therefore, has several subassemblies which will be described in detail below, as best shown in FIG. 3. The wheelchair 10 has a main frame assembly 12, a wheel mounting assembly 24 mounted on each side of the frame assembly 12, a large wheel 62 mounted to each of the wheel mounting assemblies 24, and caster assemblies 94 mounted forward of the large wheels 62. A seat base assembly 120 and a seat back assembly 166 are mounted to the main frame assembly 12. Two leg and foot rest assemblies 234A and 234B are mounted to the main frame assembly 12.

Figure 2:
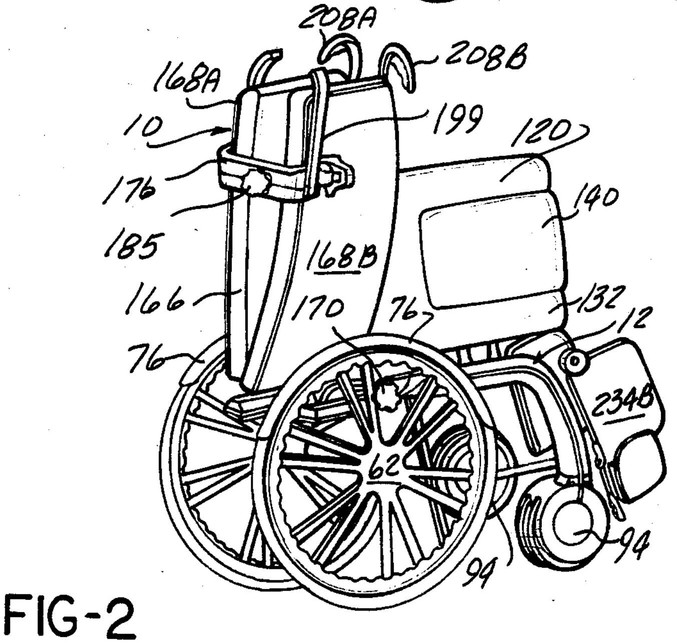
FIG. 2 is a rear perspective view of the wheelchair of FIG. 1, illustrated in a fully folded position.
Figure 4:
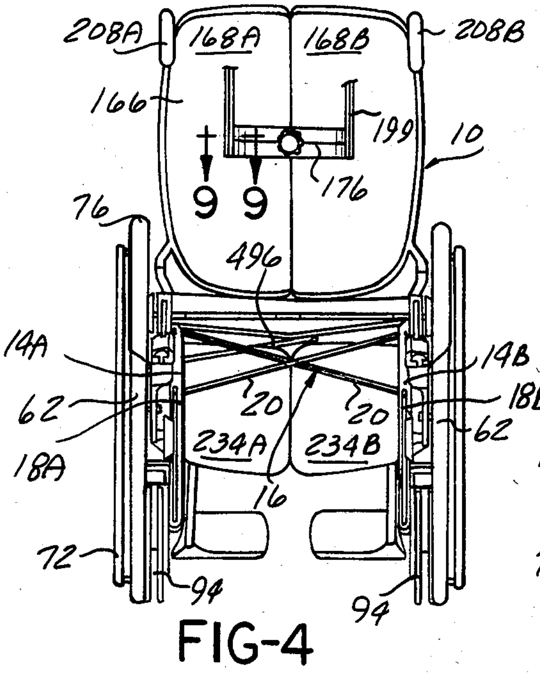
FIG. 4 is a back view of the wheelchair of FIG. 1 in the fully upright and opened position.
Figure 5A:
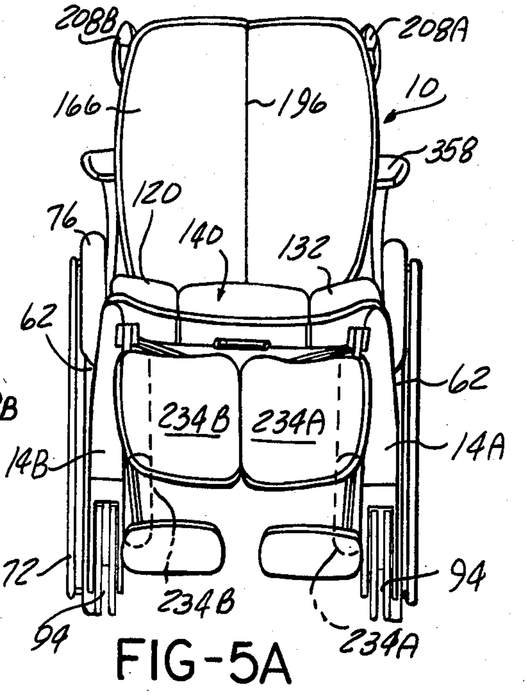
FIGS. 5A and 5B are, respectively, a front view and a top view of the wheelchair of FIG. 1 in the fully upright and opened position, the leg rests being shown in phantom line at FIG. 5A rotated away from the functioning position shown in solid line in FIGS. 5A and 5B in the functioning position.
Figure 6:
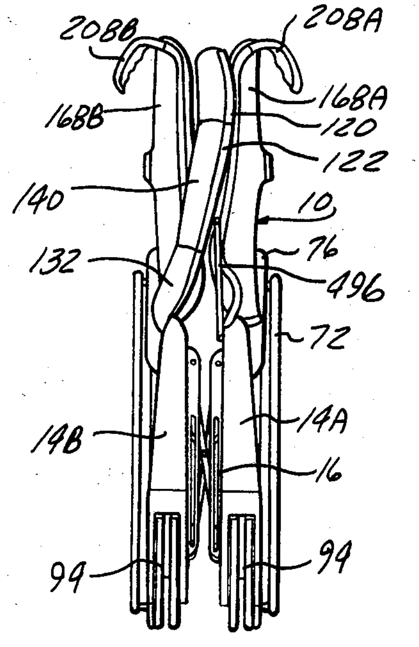
FIG. 6 is a front view of the wheelchair of FIG. 1 in the folded position.
Figures 10, 11, 12:
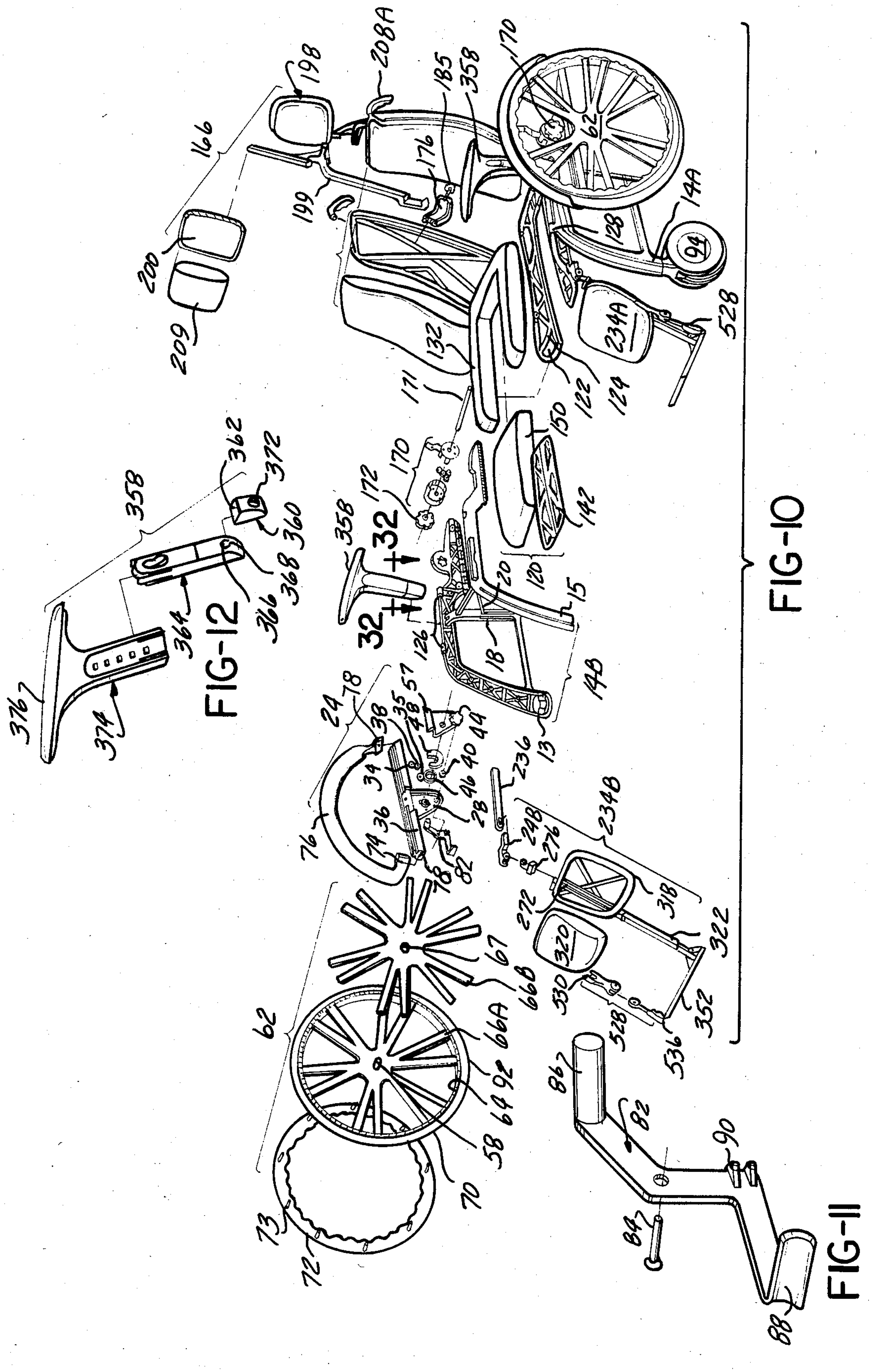
FIG. 10 is an exploded perspective view of the wheelchair of FIG. 1.
FIG. 11 is an exploded perspective view of a hand brake of the wheelchair of FIG. 1.
FIG. 12 is an exploded perspective view of the arm rest of the wheelchair of FIG. 1.
Figure 13:
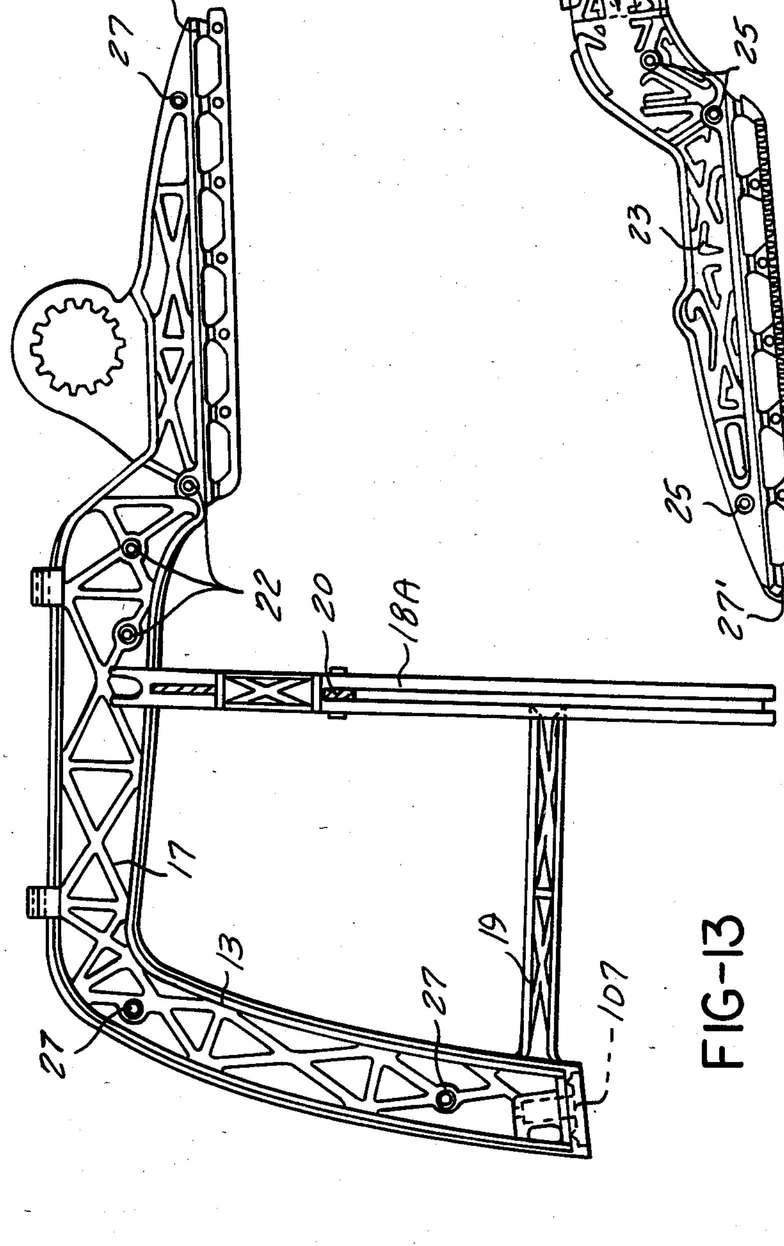
FIG. 13 is an elevational view of one of the outer side frame members of the wheelchair of FIG. 1.

As best shown in FIGS. 4 and 6, the main frame assembly of the wheelchair 10 consists of two side frames 14A and 14B interconnected with each other by means of a scissor mechanism 16. The scissor mechanism 16 illustrated has side members 18A and 18B formed integrally with or interconnected with each side frame 14A and 14B, as shown in FIG. 10. The scissor mechanism 16 further has cross members 20 (FIG. 4), each pivotally attached at one end to the upper end of one of the side members 18A or 18B and pivotally and slidably interconnected at the other end to the opposite one of the side members 18A or 18B, as shown in FIGS. 10 and 13. The two cross members 20 are also pivotally fastened to each other mid-way between their respective ends, as illustrated in FIGS. 4 and 6. The scissor mechanism 16 is, therefore, movable between a first position wherein the side frames 14A and 14B are spaced apart as shown in FIGS. 1, 3, 4, 5A and 5B, and a second position wherein the side frames are adjacent to each other, as shown in FIGS. 2 and 6.

Each of the side frames 14A and 14B the side members 18A and 18B, and the cross members 20 of the scissor mechanism 16 are formed of a lightweight material such as aluminum, titanium, or a graphite composite material so as to minimize the weight of these components. The use of such materials offers the advantage of reduced weight, ease of handling, durability, and resistance to environmental conditions. Preferably, these components and other suitable structural components, described herein, are formed by injection molding nylon filled with carbon fiber to create a strong, lightweight structure. This method of forming lightweight structural components for the wheelchair 10 is preferred, since it may easily be used to form, in an appropriate shape, structural components offering desired characteristics of low weight and great strength in an aesthetically pleasing form. The wheelchair 10 of FIG. 1A may weigh less than twenty pounds (20 lbs.) when such a material is used for all structural components. When necessary, each component formed of a lightweight material is provided with reinforcing ribs to provide sufficient strength without unnecessarily increasing the weight of these components.

Each of the side frames 14A or 14B may be constructed of an outer side member 13 (FIGS. 10 and 13) and an inner side member 15 (FIGS. 10 and 14) or from a single member. The side frames 14A and 14B may be filled with structural foam and spheroid balls to take up volume so as to use less structural foam and to minimize the weight of the side frames without taking away strength, as is well known in the aerospace parts industry.

The structure of the outer side frame member 13 is best shown in FIG. 13. As seen in FIG. 13, the inner face of the outer side member is provided with a plurality of ribs 17 for providing strength to the outer side member 13. The side member 18A of the scissor mechanism 16 is interconnected at its upper end with the outer side member 13 and extends downwardly therefrom. A web member 19 extends from the lower portion of the outer side member 13 to an intermediate portion of the side member 18A to provide additional rigidity.

Figure 14:
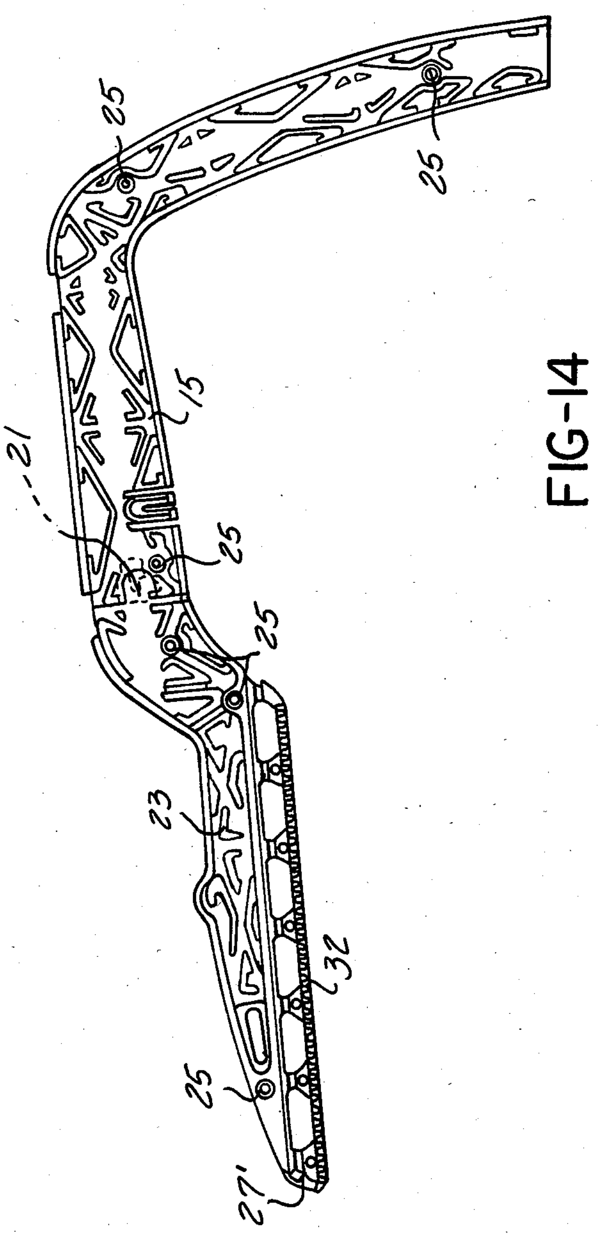
FIG. 14 is an elevational view of one of the inner frame members of the wheelchair of FIG. 1.

An inner side member 15 is illustrated in FIG. 14. The inner side member 15 is optional but is provided in the preferred embodiment for aesthetically completing the main frame assembly 12 and for providing additional strength thereto. If desired, however, the portion illustrated to the left of the phantom line 21 on FIG. 14 may be eliminated so as to reduce the weight of the wheelchair 10. In the preferred embodiment, the portion of the inner side member 15 to the left of the line 21 cooperates with the outer side frame member 13, in a manner described shortly, to secure the main frame assembly 12 to the wheel mounting assembly 24.

The inner side member 15 is further provided with a plurality of bosses 23 which cooperate with the plurality of ribs 17 of the outer side member 13 when the inner side member 15 is assembled to the outer side member 13. The outer side member 13 and inner side member 15 are secured together by several screws, not shown in the drawing, passed through apertures 25, in the inner side member 15 and threaded into threaded apertures 27 in the ribs 17 of the outer side member 13.

Figure 15:
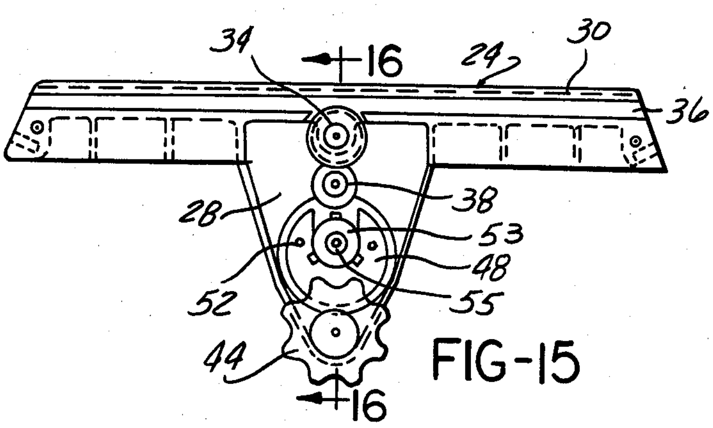
FIG. 15 is an enlarged cut-away side view of the wheel base adjustment mechanism of FIG. 1.
Figure 16:
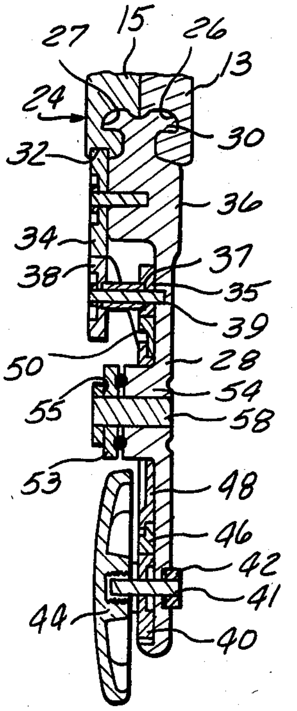
FIG. 16 is a sectional view taken substantially along lines 16—16 of FIG. 15.

The wheelchair 10 is provided with two large wheels 62, one located on each side of the main frame assembly 12. Each of the large wheels 62 is movably interconnected with one of the side frames 14A or 14B by means of the wheel mounting assembly 24. The wheel mounting assembly 24 is best shown in FIGS. 15 and 16 but is also shown in an exploded perspective form in FIG. 10. A track is formed in each side frame 14A and 14B between the outer and inner side members 13 and 15, respectively, of the side frames 14A or 14B. As shown in FIGS. 13 and 14, the track is formed by providing channels 29A and 29B, respectively, inside the outer and inner side members 13 and 15. The channels 29A and 29B each accept a longitudinally extending lip or flange 30 (FIGS. 15 and 16) of a wheel mounting frame 36 for movement of the wheel mounting frame along the track. A rack 32 (FIGS. 14 and 16) is provided on the lower side of the inner side member 15 immediately below the channel 29B.

A triangular shaped flange 28 extends downwardly from the wheel mounting frame 36. A gear 34 (FIGS. 15 and 16) is rotatably mounted to the flange 28 of the wheel mounting frame 36 and engages the teeth of the rack 32. The gear 34 also engages a second gear 38 which is also rotatably mounted to the flange 28 at a location below the first gear 34. A third gear 35 is mounted coaxially with the second gear 38 on a screw 39 and is constrained to rotate therewith by a keyed bushing 37. A ring gear 46 engages the lower end of the third gear 35. The ring gear 46 is secured to the flange 28 by means of an adapter 48 concentrically fitted to the ring gear 46. The adapter 48 is a disc shaped member having an outer diameter slightly smaller than the inner diameter of the ring gear 46, whereby the adapter 48 may be inserted partially into the ring gear 46. The adapter 48 has an enlarged diameter portion forming a flange 50 to secure the ring gear 46 in position. Screws 52 secure the adapter 48 to the wheel mounting frame 36. A cylindrical boss 54 extends outwardly from the flange 28 through the center of the adapter 48. A bearing 53 is fitted to the end of the boss 54. The wheel 62, not shown in FIGS. 15 or 16, is mounted to the wheel mounting assembly 24 by means of an axle 58 passed through a mounting aperture in the wheel, described later, and through suitable apertures in the boss 54 and the bearing 53 and is fastened therebehind by a nut 55.

A fourth gear 40 is provided below the ring gear 46 for engagement therewith and is rotatably mounted to the lower end of the wheel mounting frame 36 by means of a threaded pin 41 and a nut 42. A hand operable knob 44 is also mounted to the threaded pin 41 and is adapted to drive the fourth gear 40. Rotation of the hand knob 44 thereby rotates the gear 34 through the gears 40, 46, 35, and 38, thereby causing the wheel mounting assembly 24 to move along the track 26. It may, therefore, be appreciated that the wheel 62 may be adjusted forwardly or rearwardly relative to the main frame assembly 12 by the rotation of the knob 44. As shown in FIG. 10, an optional plate 57 may be provided to cover the gears of the wheel mounting assembly 24.

Referring now to FIG. 10, details of the construction of the large wheel 62 can be seen. Each wheel 62 has a rim 64 and a pair of wheel inserts 66A and 66B. In the example illustrated, the inserts 66A and 66B are ornamentally suggestive and functionally equivalent to spokes. The axle 58 may be formed with the outer insert 66A and passed through an aperture 67 and the inner insert 66B for fastening the wheel 62 to the wheel mounting assembly 24. Each wheel 62 further is provided with a tire 70 fitted in the rim 64 in a conventional manner. The rim may be provided with a handgrip 72 to assist the occupant of the wheelchair 10 in rotating the wheels to drive the wheelchair 10 forward. In the example shown in FIG. 10, the handgrip 72 is formed of a resilient material for the comfort of the occupant and is attached to the outside of the rim 64, for example, by means of bolts 73.

Figure 33A:
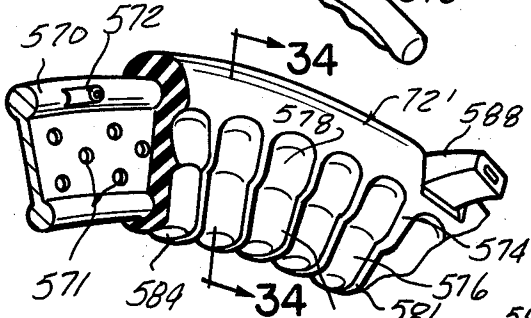
FIGS. 33A and 33B are partial cut-away perspective views of, respectively, the inside and the outside of the hand grip of the wheelchair of FIG. 1.
Figure 33B:
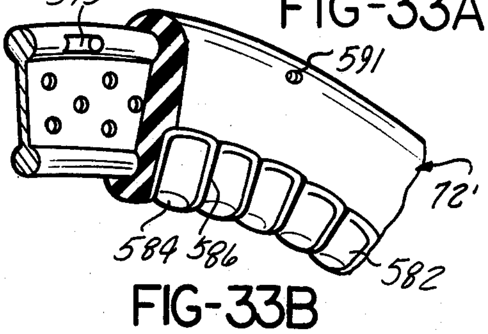
Figure 34:
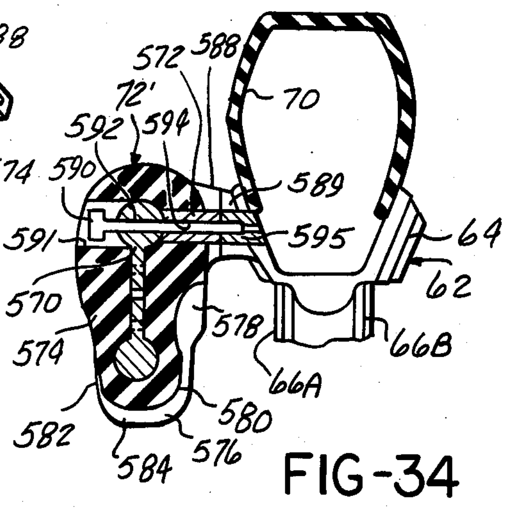
FIG. 34 is a sectional view taken along lines 34—34 of FIG. 33A.

FIGS. 33A, 33B, and 34 illustrate in detail a preferred handgrip 72' of the wheelchair 10. The handgrip 72' has an inner frame 570 preferably formed of a lightweight metallic material or a composit material. The inner frame 570 may be provided with a plurality of lightening holes 571. The inner frame 570 may also be provided with a series of spaced apart bosses 572 and 573 extending therefrom. An outer handgrip member 574 is formed around the inner frame 570. The outer handgrip member 574 is preferably formed of a resilient material and is preferably provided with a series of indentations 576 suitable for gripping by the fingers of the occupant of the wheelchair. The outer handgrip member 574 is prevented from moving relative to the inner frame 570 by the bosses 572 and 573. Each of the grip indentations extends one third of the way around the outer handgrip member 574. Each grip indentation 576 is provided with a rounded fingertip portion 578 and an intermediate inside portion 580 extending therefrom on the inside face of the handgrip 72'. The fingertip portion 578 is deeper than the intermediate inside portion 580. Each grip indentation further is provided with an outside portion 582 on the outwardly facing face of the handgrip 72' and an additional indentation portion 584 interconnecting the intermediate and outside indentation portions, 580 and 582. Each of the grip indentations 576 is separated from adjacent indentations by ridges 586.

The ridges 586 cooperate with the fingers of the occupant of the wheelchair to facilitate ease of operation of movement of the chair. The grip indentations 576 may be of varying proportions, depending on the size of the hand of the occupant of the wheelchair. In the preferred embodiment, each indentation is designed to approximately the shape of the index finger of the occupant and the ridges 586 are designed to approximate the comfortable spacing between the index finger and the adjacent fingers of the occupant when the handgrip 72' is gripped in a comfortable natural manner.

The handgrip 72' is further provided with a mounting flange 588 extending outwardly from the outer handgrip member 574 surrounding each boss 572 on the inner face of the inner frame 570. The rim 64 of the wheel 62 is provided with a flange 589 for each flange 588. A bolt 590 is provided for each flange 588 for securing the handgrip 72' to the rim 64 of the wheel. A clearance aperture 591 is provided in the outer handgrip member 574 on the outer surface thereof opposite each flange 588 for the bolt 590. Each bolt 590 is passed through a suitable aperture 592 in the inner frame 570 in an aperture 594 in the respective boss 572 and is threaded into an appropriate threaded bore 595 in the rim 64 of the wheel 62.

As shown in FIGS. 1 through 6, a fender 76 may be provided to cover the top of each wheel 62. Each end 78 of the fender is attached, as shown in FIG. 10, to one end of the track 26 by means of screws 74.

Referring now to FIGS. 10, 11, and 29, each of the wheels 62 is provided with a hand operable brake 82 for decelerating the wheel 62 and for locking the wheel in a fixed position when desired. The brake 82 consists of a stamped member having the general shape of a dog paw and pivotally mounted by means of a screw 84 to the wheel mounting assembly 36, as shown in FIG. 29. A handle 86 is attached to one end of the brake 82. A portion of the brake 82 may be selectively rotated in a counterclockwise direction as illustrated in solid line in FIG. 29 to cause a paddle 88 to engage the outer surface of the tire 70 and to thereby decelerate the wheel 62. The brake is also provided with at least one gear tooth 90 (See FIG. 11) selectively engageable with a ring gear 92 mounted on or formed with the rim 64 to positively lock the wheel against rotation relative to the wheel mounting assembly 36 when the brake is rotated in a clockwise direction, as illustrated in phantom line in FIG. 29. When the wheelchair 10 is to be operated, the brake 82 is normally in an intermediate position between the decelerating position and the ring gear engaging positions described and illustrated. In the intermediate position, the brake 82 does not inhibit or prevent rotation of the wheel 62.

Figure 18:
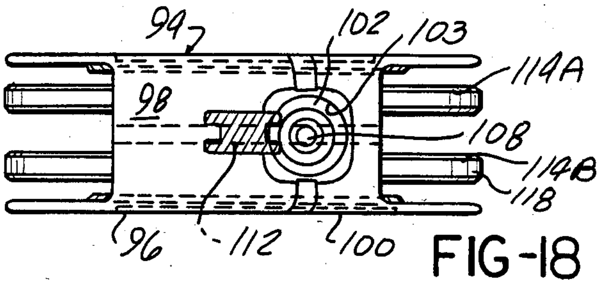
FIGS. 18 and 19 are top side views, respectively thereof.
Figure 17:
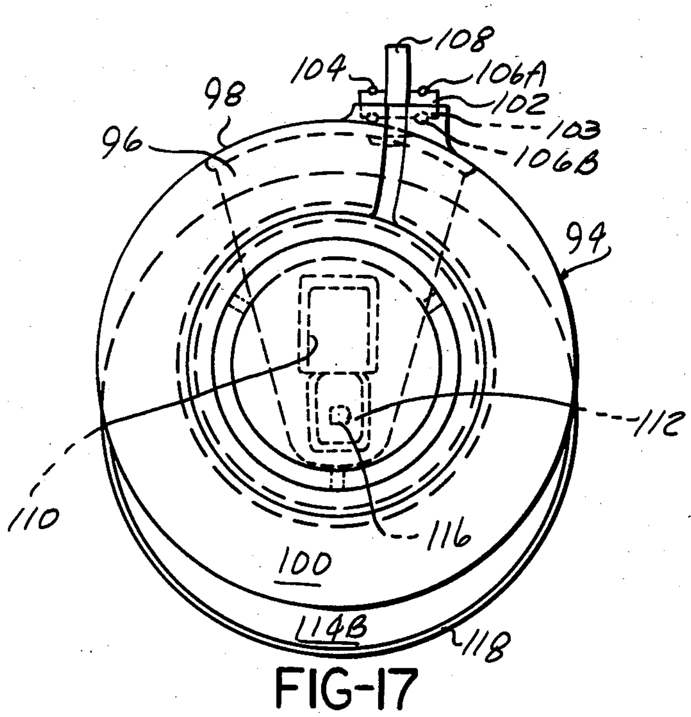
FIG. 17 is a side view of one of the caster assemblies of FIG. 1.
Figure 19:
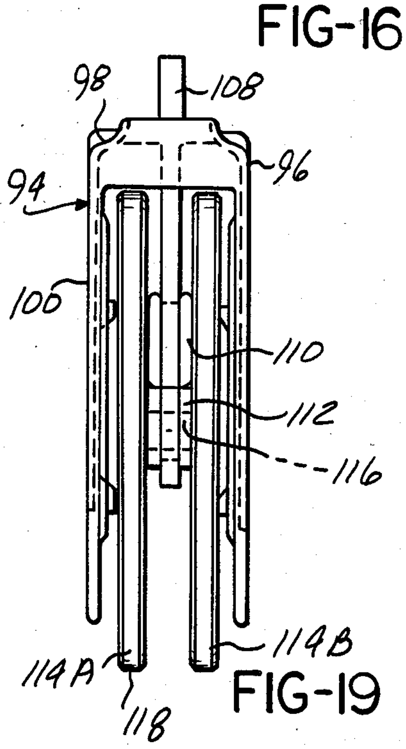

As shown in FIGS. 1, 2, 5A and 6, the wheelchair is also provided with two caster assemblies 94, each being mounted to one of each side frames 14A and 14B in a location forward of the large wheel 62. The details on the construction of each caster assembly can be seen by referring to FIGS. 17, 18, and 19. Each caster assembly 94 is provided with a cover 96 having a curved top portion 98 and two flat side portions 100 extending downwardly from the top portion 98. A large caster bearing 102 (FIG. 17) is fitted partly into a bore 103 in the top portion of the ornamental cover and partly into a bore in the lower end of the corresponding side frame 14A or 14B. Several ball bearings 104 are provided in raceways 106A and 106B above and below the caster bearing 102. A spindle shaft 108 extends upwardly through the top portion 98 of the cover 96, through the center of the caster bearing 102 and through an aperture 107 (FIG. 13) in the lower end of the side frame 14A or 14B and is fastened therebehind by any appropriate means. A spring 110 is attached to the lower end of the spindle shaft 108. A wheel axle guide 112 is suspended from the lower end of the spring 110. Two caster wheels 114A and 114B are pivotally mounted to the wheel axle guide by means of an axle 116. Two wheels are used so as to reduce the resistance of the casters to turning. Each of the caster wheels 114A and 114B shown in the drawings are provided with a tire 118.

Referring again to FIGS. 1–6, the wheelchair 10 is further provided with a seat base assembly 120 which rests upon and is interconnected with the main frame assembly 12. The seat base assembly includes a seat base frame 122 (FIG. 10) formed of lightweight material and having several ribs 124 formed thereon for strength. The seat base frame 122 is attached to the side frame 14B by a pair of hinges 126, as illustrated in FIGS. 3 and 10. The other side of the seat base frame 122 is removably attached to the other side frame 14A by means of a latch mechanism 128, shown only in part in FIG. 10. When the latch mechanism 128 is fastened, the seat base frame 122, as well as the weight of the wheelchair, prevents the main frame assembly 12 from being folded. When the latch mechanism 128 is not fastened, the seat base frame 122 may be pivoted upwardly about the hinges 126 and the main frame assembly 12 may be folded.

As best shown in FIGS. 4 and 6, a diagonal arm 496 is provided for the seat base assembly 120 to facilitate the proper folding of the wheelchair 10. One end of the diagonal arm 496 is pivotally mounted to the side frame 14A. The other end of the diagonal arm is pivotally mounted to the center of the underside of the seat base frame 122.

As best illustrated in FIG. 22, a seat base cushion 132 is fastened, for example by Velcro® fasteners 134 to the seat base frame 122. As shown in FIGS. 21 and 22, the seat base cushion 132 is preferably constructed of a laminated series of foam layers 136A, 136B and 136C having varying densities. The cushion illustrated, for example, may have a four pound density in the outside layers 136A and 136C, and may have a ten pound density in the inner layer 136B. By varying the thickness of the inner layer 136B, the cushion can be designed to have more or less support in certain regions. The cushion may, for example, be designed to give more support near the rear portion of the seat and less support near the legs so as not to cut off circulation in the legs of the occupant of the wheelchair. The seat base cushion 132 is further provided with an aesthetically pleasing cloth cover 138.

The seat base assembly 120 is further provided with a center insert 140 best shown in FIGS. 1, 2, 10 and 21. As illustrated in FIG. 21, the center insert 140 consists of a center frame portion 142 having a peripheral flange 144 cooperating with a track 146 on either side of an aperture 148 in the seat base frame 122. The center frame portion 142 is, therefore, slidable into and out of engagement with the seat base frame 122. A cushion 150 is attached, for example, by Velcro ® (not shown) to the center frame portion 142. The cushion 150 is constructed similarly to the seat base cushion 132 and is provided with a cloth cover 152 which may match or compliment the cloth cover 138 of the seat base cushion 132.

Figure 35:
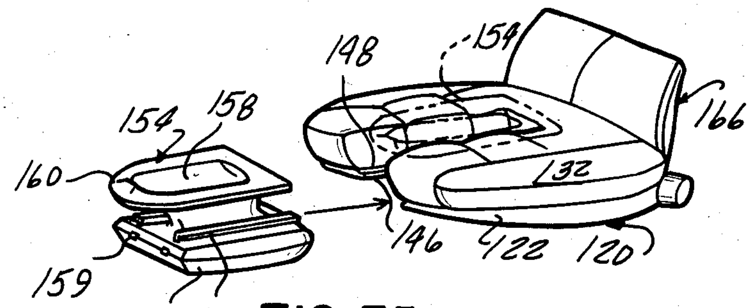
FIG. 35 is a perspective exploded view of the seat base of the wheelchair of FIG. 1 and a portable toilet capable of being attached to the seat base, the portable toilet being illustrated in phantom line attached to the seat base.

The removable center insert 140 makes it possible for the occupant to use an insertable toilet 154 illustrated in FIG. 35. The insertable toilet 154 is provided with a peripheral flange 156 similar to the flange 144 of the center insert so that the toilet 154 may be inserted into the aperture 148 in the seat base assembly 120. The insertable toilet 154 is provided with a basin 158 and with an upwardly extending rim 160.

The insertable toilet 154 is further provided with a refuse storage compartment 157 hingedly fastened on one side, as shown at 159 to the basin 158 and removably fastened on the opposite side to the basin 158. The basin 158 may, thus, be selectively pivoted away from the refuse storage compartment for cleaning.

Figure 36:
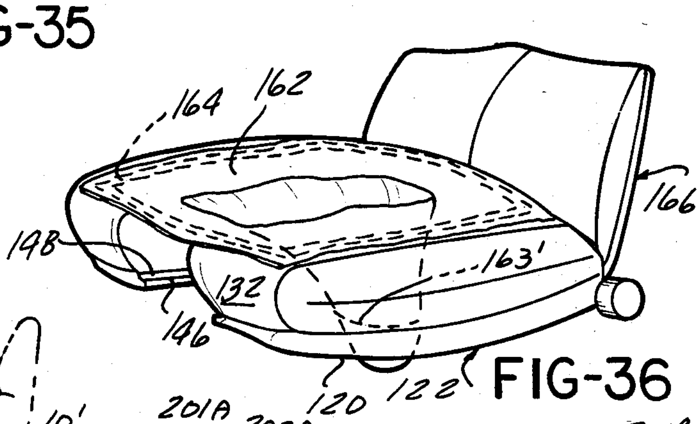
FIG. 36 is a perspective view of the seat base of the wheelchair of FIG. 1 and a disposable seat liner.

The insertable toilet 154 may be used in conjunction with a sheet of flexible waterproof material 162 (FIG. 36) for the collection and the sanitary disposal of human waste products. An example of a suitable material would be a lightweight flexible plastic sandwiched between layers of high strength cotton fiber. The sheet 162 may be secured to the seat base cushion 132 by means of two-sided fastening tape 164. When separated from the seat base cushion, the plastic sheet 162 may be gathered together around the edges and tied as a bag for disposal.

The sheet 162 may have a centrally located perforation 163' which facilitates removal of a central portion of the sheet when used with the toilet insert or with a water closet, as described later. Alternately, the disposable sheet 162 may be used without the toilet insert.

Referring again to FIGS. 1 through 7, the details of the seat back assembly 166 are depicted. The seat back assembly 166 has two frame assemblies 168A and 168B (FIGS. 2, 6 and 7), together forming a frame for the seat back. Each of the frame assemblies 168A and 168B is pivotally fastened to one of the side frames 14A or 14B. An adjustment mechanism 170 (FIGS. 1, 2, and 3) is provided between each of the frame assemblies 168A and 168B and its associated side frames 14A and 14B, respectively. Each adjustment mechanism 170 (as shown in FIG. 10) consists of a planetary gear arrangement operably interconnected with a knob 172 for manually adjusting the angle of the seat back assembly 166 relative to the side frame 14B and, therefore, relative to the seat base assembly 120. The adjustment mechanism 170 may be selected from the many seat back adjustment assemblies well known in the art and commercially available. Examples of appropriate seat adjustment mechanisms are used currently in motor vehicles for adjusting the seat backs for front seat passengers. The two seat adjustment mechanisms 170 are linked together by an adjustment rod 171 (FIG. 10) so that rotation of either knob 172 will operate both mechanisms together.

Figure 9:
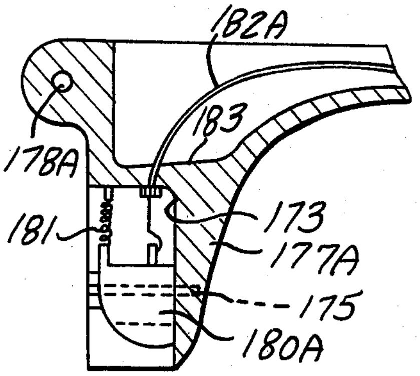
FIG. 9 is a sectional view taken along lines 9—9 of FIG. 4 and illustrates a portion of the hinge assembly.

As best shown in FIGS. 2, 4, 5, 8, and 7, the seat back frame assemblies 168A and 168B are operably interconnected with each other by means of a U-shaped hinge 176. Each arm 177A and 177B of the hinge 176 is pivotally fastened by means of pins 178A and 178B (FIG. 7) to hinge mounting portions 179A and 179B formed in the seat back frame assemblies 168A and 168B, respectively. A button 180A or 180B is provided within a suitable aperture in each arm 177A or 177B and is engageable in a suitable aperture (not illustrated) in the associated hinge mounting portion 179A or 179B to removably lock the seat back in its open position. As shown in FIG. 9 for button 180A, each button is pivotally mounted in an aperture 173 in the respective arm 177A or 177B on a pin 175. Each button is biased outwardly from the aperture 173 by means of a spring 181 extending between the button and the hinge 176. Sheathed cables 182A and 182B (FIGS. 8 and 9) extend from each of the buttons 180A and 180B, respectively, through a cavity 183 in the hinge 176 to opposite ends of a lever 184. A knob 185 is fastened to the lever 184, for manual rotation thereof, by means of a screw 187 passed consecutively through suitable apertures in the knob 185 and the hinge 176 and is threaded into a suitable threaded bore 186 in the center of the lever 184. The buttons 180A and 180B may, thereby, be selectively disengaged from the apertures 182A and 182B by manual rotation of the knob 185. An additional cable 189 may be interconnected with one end of the lever 184 for remote operation of the buttons 180A and 180B. The cable 189 may extend, in a manner not illustrated but well known in the art, to a remote control lever located at a convenient location on the wheelchair 10. For example, the lever may be similar to that used for controlling a bicycle brake.

Thus, the hinge 176 normally secures the two seat back assemblies 168A and 168B in a coplanar relationship for use as a single seat back but may be selectively operated, either through the knob 185 or through a remotely located lever to permit the seat back to be folded.

Figure 7:
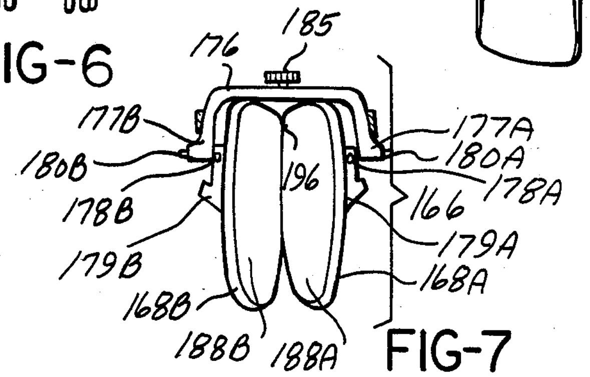
FIG. 7 is a partial top view of the seat back assembly in a folded position.

As illustrated in FIGS. 2 and 7, the seat back assemblies 168A and 168B are selectively pivotable about the pins 178A and 178B into the interior portion of the hinge 176 between the hinge mounting portions 179A and 179B, when the wheelchair is to be folded.

Referring to FIGS. 58 through 60, a modified seat back frame assembly 166' and a modified hinge 76' is illustrated for the wheelchair 10 of the present invention. As the previously described hinge 176, the modified hinge 76' is a U-shaped member, preferably formed of a composite material. Each of the arms 177A' and 177B' are pivotally fastened to one of the seat back frame members 168A' and 168B'. As best shown in FIG. 59, a lever 600A is movably interconnected with the seat back frame member 168A'. A similar lever 600B is movably interconnected with the seat back frame member 168B'. Each lever 600A or 600B is provided with a handle portion 602 located near the upper portion of the seat back frame assembly 166'. A portion of the lever 600A or 600B extends downwardly from the handle portion 602 through an aperture 604 (FIG. 59) in the seat back frame member 168A' or 168B' associated with the lever and extends downwardly between the seat back frame and the seat cushion. A latch hook 606 is formed at the lowermost end of the lever 600A or 600B. The latch hook 606 extends through a suitable aperture 607 in the seat back frame and a suitable aperture 608 in the associated arm 177A' or 177B' of the modified hinge 76' and is selectively engageable with a web 610 of material extending across the apertures 608 for selective fixed interconnection of the hinge 76' and the seat back frame assembly 166', as best shown in FIG. 61. As shown in FIG. 59, a spring 609 extends between a portion of each lever and the associated seat back frame member and places the latch hook 606 into engagement with the web 610.

As is readily apparent, each latch hook 606 may be selectively disengaged from the associated web 610 by the manual application of an upward force on the handle portion 602 of the associated lever 600A or 600B.

Figure 5B:
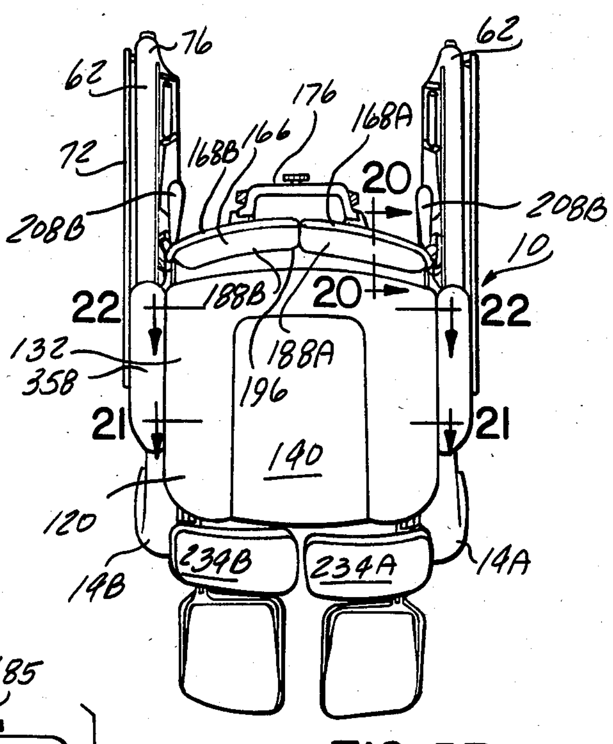

As shown in FIGS. 5B, 7, and 20, the seat back assembly 166 is further provided with two cushions 188A and 188B, each fastened to one of the seat back frames 168A and 168B by means, for example, of Velcro® strips 190. Each cushion 188A and 188B is composed of laminated layers 192A through 192C (FIG. 20) of foam material having varying weight densities. In the example illustrated, the cushion is designed for extra lumbar support if outside layers 192A and 192C are made from a lower density material than the inside layer 192B. Each of the cushions 188A and 188B is provided with a cloth cover 194. The cloth covers 194 may be, if desired, stitched together at their adjacent front edges as shown at 196 (FIGS. 5A, 5B and 7).

Figure 37:
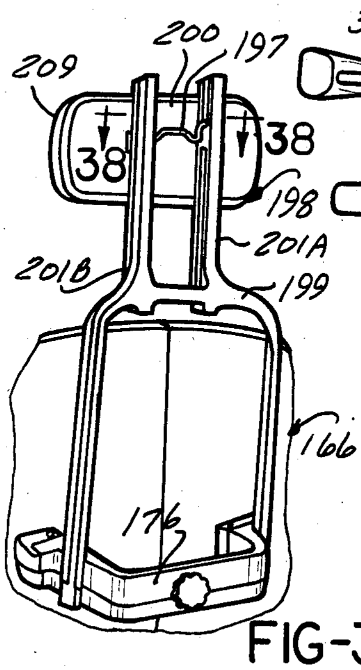
FIG. 37 is a partial rear perspective view of the seat back and the head rest assembly of FIG. 1.

A head rest 198, illustrated in FIGS. 1 and 10, but best shown in FIG. 37, is provided for the seat back assembly 166. The head rest 198 has a support structure 199 attached, for example by welds, at its lower end to the hinge 176 and extending upwardly therefrom. The support structure 199 is designed and proportioned to avoid interference with the folding of the seat back assembly 166, described above, when folded into the hinge 176. A head rest frame 200 is attached to the upper end of the support structure 199 by means of a height adjustment mechanism 197.

Figure 40:
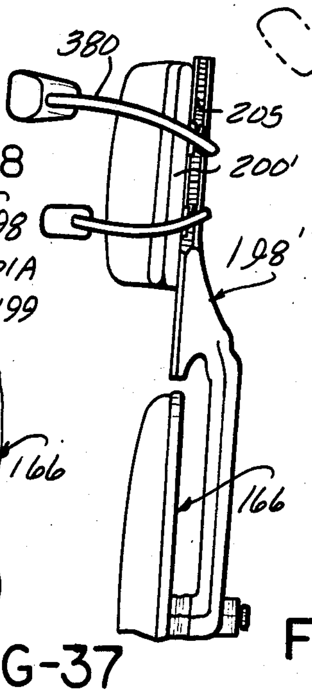
FIG. 40 is a side view of the alternate head rest of FIG. 39.

The illustrated height adjustment mechanism 197, has two side posts 201A and 201B extending upwardly from the support structure 199 in a parallel and spaced relationship. Each of the side posts 201A and 201B has an inwardly facing channel 202A or 202B. A head rest guide 203A or 203B is slidably fitted into each channel 202A or 202B, respectively. The head rest frame 200 is attached by appropriate means, such as screws (not shown) to each of the guides 203A and 203B. A manually operable engagement bar 204 extends between the guide members 203A and 203B and is pivotally fastened at each respective end thereto. Each of the channels 202A and 202B are provided with a plurality of spaced apart indentations 205 (FIG. 40). Abutment means 206A and 206B are formed at each of the ends of the engagement bar 204. The abutment means 206A and 206B pass through suitable apertures through to the guides 203A and 203B, respectively, and engage the indentations 205. At least one spring 207 is provided between the engagement bar 204 and one of the guides 203A or 203B to bias the abutment means 206A and 206B into engagement with the indentations 205. The abutment means 206A and 206B may be separated from the indentations 205 so that the head rest frame 200 may be raised or lowered relative to the support structure 199 by manual rotation of the engagement bar 204.

A small cushion 209, similar to the cushions 132, 150, 188A and 188B, is fastened, for example, by Velcro® strips (not shown) to the head rest frame 200.

As shown generally in FIGS. 1 through 6, the seat back assembly 166 is further provided with handles 208A and 208B. As best depicted in FIG. 30, showing a partial cut-away view of one of the handles 208A, each handle is provided with a handgrip portion 210. Each handle is further provided with a bore 212 and a counterbore 214 opposite a mounting surface 216. The mounting surface 216 has several indentations 218 equally spaced around the bore 212. The handle 208A is fastened to an extension 220 of the seat back frame 168A by means of a shoulder bolt 222, passed through a spring 226, the bore 212, and threaded into an internally threaded insert 224 in the extension 220. The shoulder bolt 222 is torqued to an appropriate torque level so as to compress the spring 226 a predetermined amount. The insert 224 may be externally knurled and may be inserted in the mold used to form the seat back frame 168A if the seat back frame is to be made of a graphite composite material. Alternatively, if the seat back frame 168A is to be formed of a metallic material, such as aluminum or titanium, the extension 220 may be provided with an internal thread during a secondary operation.

The insert 224 is provided with an attachment surface having several bosses 230 extending therefrom and cooperating with the indentations 218 in the surface 216 of the handle 208A. The bosses 230 act as detents to inhibit inadvertent rotation of the handle 208A relative to the seat back frame 168A. The handle may, however, be rotated by the application of a sufficient torque to the handgrip portion 210 to overcome the force of the spring 226 and detents and to thereby further compress the spring. It may readily be appreciated, therefore, by one skilled in the art, that the handle 208A may be rotated from the position shown in FIG. 3 in solid line where the handgrip portion 210 is downwardly oriented to the position shown in phantom line in the same Figure, wherein the handgrip portion 210 is upwardly oriented. Similarly, the handle may be rotated so that the handgrip portion 210 is oriented to the left or to the right.

Referring again generally to FIGS. 1 through 5A, 5B, and FIG. 10, the wheelchair 10 is further provided with symmetrically identical foot and leg rest assemblies 234A and 234B. The details of one of the foot and leg rest assemblies 234A are shown in FIG. 10 and FIGS. 23 through 27.

The foot and leg rest assembly 234A has a horizontal strut 236 (FIGS. 2, 3, and 24) attached to the seat base frame 122. One end of the strut 236 is secured to the seat base frame 122 by any appropriate means. The strut 236 extends horizontally forward from the seat base frame 122 and is selectively adjustable, forward and back, relative to the seat base frame 122. Furthermore, the strut may be selectively separated from the seat base frame 122 when the leg and foot rest assemblies are not in use.

Figure 28A:
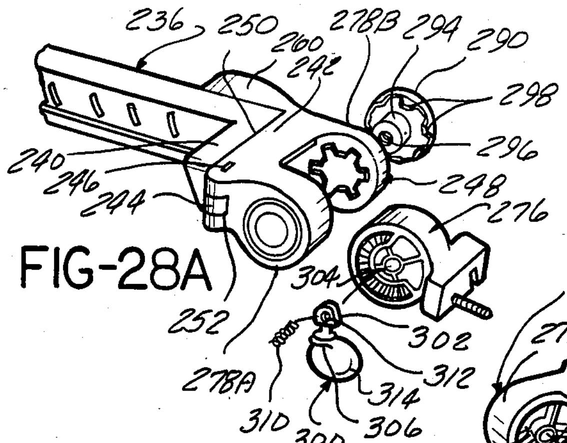
FIGS. 28A and 28B are exploded respective views, taken from opposite sides, of a portion of the foot and leg rest assemblies of FIGS. 24 through 27.
Figure 28B:
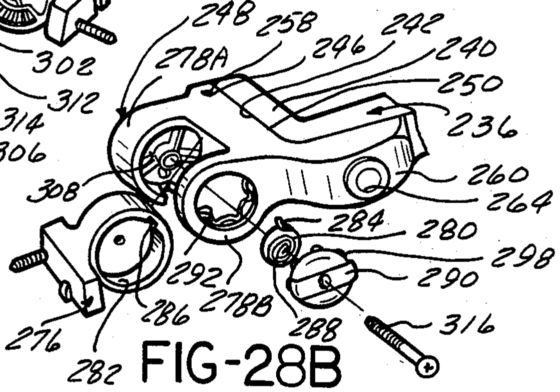

The free end 240 of the strut 236, as shown in FIGS. 28A and 28B, is provided with an outwardly oriented portion defining a forward face 242 having a horizontal forwardly facing flange 244. A vertical bore (not illustrated) is provided through the flange 244 in a location toward the outside of the wheelchair.

An elbow member 248 is pivotally fastened to the strut 236. The elbow member 248 has a face 250 having a channel 252 accepting the flange 244. A vertical bore 246 is provided upwardly through the elbow member 248 across the channel 252, the bore 246 being aligned with the abovementioned vertical bore through the flange 244. The portion of the bore 246 above the channel 252 is provided with threads. An elbow pivot screw 258 is passed upwardly through the vertical bores and engages the threads to pivotally fasten the elbow member 248 to the strut 236. Each elbow member 248 is thereby pivoted relative to the strut so that the associated leg and foot rest assembly 234A or 234B may be selectively pivoted out of the way, as shown in phantom lines, FIG. 5A.

Latching means for securing the foot and leg rest assembly in the functioning orientation, shown in solid line in FIG. 5A, are also illustrated in FIGS. 23, 28A and 28B. The elbow member 248 is provided with a flange 260 extending rear from the side of the elbow member remote from the elbow pivot screw 258. A similarly shaped flange 262 (FIG. 23) extends, first outwardly, then forwardly, from an intermediate portion of the strut 236 such that, when the elbow member is in the position shown in solid line in the drawing, the flange 262 is fitted within the flange 260. A button 264 is provided between the flange 262 and the strut 236. The button 264 is biased outwardly by means of a spring 266 disposed between the button 264 and the strut 236. A portion of the button 264 is biased by the spring 266 through apertures and through the flanges 262 and 260, respectively, to removably interlock the flanges and, thereby, to removably interlock the elbow member 248 with the flange 244 in the position shown in FIG. 5A, and elsewhere, in solid line. The elbow member 248 may be rotated away from the strut 236 to the position shown in phantom line in FIG. 5A when the button 264 is manually depressed to permit separation of the flanges 260 and 262.

As generally shown in FIG. 24, a leg brace member 272 is pivotally fastened to a yoke portion 274 of the elbow member 248. The leg brace member 272 is provided at one end with an adjusting head 276, best shown in FIGS. 28A and 28B, partly fitted between two arms 278A and 278B of the yoke portion 274. A coil spring 280 is fitted into an aperture 282 in the adjusting head 276 and has an outer tab 284 fitted into a slot 286 in the adjusting head 276. The coil spring 280 also has an inner tab 288. A spring adjustment cap 290 is removably fitted partly through an aperture 292 through the arm 278B. The spring adjustment cap 290 has a centrally located cylindrical extension 294 fitted into the center of the coil spring 280. A slot 296 in the extension 294 accepts the inner tab 288 of the coil spring. The spring adjustment cap 290 is provided with several locating pins 298 which prevent rotation of the spring adjustment cap relative to the arm 278B when the cap is fully seated in the aperture 292.

A release button 300 is provided between the spring adjusting head 276 and the arm 278A of the yoke. The release button 300 has a tooth 302 selectively engageable with slots 304 on the surface of the adjusting head 276 opposite the aperture 282. The button further has a flange 306 inserted into an aperture 308 in the arm 278A. A spring 310 is also provided in the aperture 308 and extends there into a small aperture 312 in the surface of the release button 300 opposite the tooth 302 and biases the tooth 302 into the slots 304. The release button 300 further has a manually operable handle 314 extending away from the region of the yoke portion 274 and the adjusting head 276 for manually and temporarily disengaging the tooth 302 from the slots 304. A screw 316 is passed progressively through the centers of the spring adjustment cap 290, the coil spring 280, the aperture 292, and the spring adjusting head 276 and is threaded into a threaded bore in the arm 278A. The coil spring 280 provides a preselected torsional force on the spring adjusting head 276 to aid in raising the leg brace member when the release button is depressed.

As best shown in FIG. 10, a leg brace frame 318 is attached, for example by means of welds, to the leg brace member 272. A leg brace cushion 320 similar to the cushions described above is fastened, for example, by means of Velcro® strips (not shown), to the leg brace frame 318.

A leg brace shaft 322 is interconnected with the lower end of the leg brace member 272 in the manner shown in FIGS. 24 through 27. Both the leg brace shaft 322 and the leg brace member 272 are hollow rectangular elements. The lower end of the leg brace member 272 and the upper end of the leg brace shaft 322 are provided with slots permitting these elements to be interconnected. The leg brace member 272 has a greater thickness but a lesser width than the leg brace shaft 322. The manner in which these elements interlock is best illustrated in FIG. 27 wherein the walls of the leg brace shaft 322 are numbered 324A through 324D and the walls of the leg brace member 272 are numbered 330A through 330D. The leg brace member 272 and the leg brace shaft 322 are, therefore, interlocked in a manner providing the needed strength, yet providing adjustability therebetween.

The wall 324A of the leg brace shaft 322 is provided with a series of slots 332. The wall 330A of the leg brace member 272 is provided with a latching device selectively engageable in the slots 332 to prevent reciprocation of the leg brace shaft 322 along the leg brace member 372. The wall 330A is provided wlth an elongated aperture 338 (FIGS. 25 and 26) and a wall 340 extending outwardly from the wall 330A and upwardly until the wall 340 is adjacent to the elongated aperture 338.

A release button 336 is pivotally mounted on a pivot pin 342 extending between portions of the wall 340 and extending generally parallel to the wall 330A. The release button 336 is formed of a resilient material. The release button 336 has an elongated flat portion 345 shaped similarly to the aperture 338. The release button 336 further has a pair of hook-shaped arms 346 extending downwardly near opposite edges of the same side of the elongated flat portion 345 thereof. The hook-shaped arms 346 engage the pivot pin 342. A tab 348 extends from the elongated flat portion 345 and is selectively engageable in any of the slots 332. A second and longer tab 350 extends from an elongated flat main portion 345 of the release button 336 and extends therefrom to rest against the wall portion 330A. A shallow indentation 344 is provided in the surface of the release button opposite the second tab 350.

The release button 336 is designed such that the second tab 350 is in a pre-stressed condition when the components are assembled as described, so as to bias the tab 348 into one of the slots 332. The second tab 350 thereby acts as a spring member and biases the first tab 348 into engagement with the slots 332. The release button 336 may be disengaged from the slot 332 by pressing against the indentation 344 with a finger to thereby further compress the second tab 350 and to pivot the button about the pin 342.

A foot rest pad 352 (FIG. 24) is fastened to the lower end of the leg brace shaft 322 by means of a screw and a nut. The foot rest pad 352 may be adjusted angularly relative to the leg brace shaft 322 by temporarily loosening the screw. The position of the foot rest pad 352 relative to the strut 236 is adjusted for the comfort of the occupant by operation of the release button 336 described above.

Referring again generally to FIGS. 1, 3, 5A, 5B and 10, the wheelchair of the present invention is also provided with two arm rest assemblies 358. The details of one arm rest assembly 358 is shown in FIG. 12. Each arm rest assembly 358 has a base member 360 fastened, for example, by means of screws (not shown), to the associated side frame 14A or 14B. The base member 360 is located entirely below the top of the seat base cushions 132. The base member 360 is also provided with a cavity 362 accepting the lower end of an arm rest shaft 364. The arm rest shaft is provided with a spring biased button 366 for removably interconnecting the arm rest shaft 364 with the base member 360. In the example illustrated, the button 366 is formed integrally with the arm rest shaft and is attached thereto by a narrow web of material shown at 368. When the lower end of the arm rest shaft 364 is inserted into the cavity 362 in the base member 360, the button 366 engages an aperture 372. The arm rest shaft 364 may be separated from the base member 360 by manually depressing the button 366.

The wheelchair 10 is illustrated with the arm rest assemblies 358 removed in FIGS. 2, 4 and 6 of the drawings. An arm rest post 374 is adjustably attached at one of its ends to the arm rest shaft 364 in a manner similar to the attachment of the leg brace member 272 to the leg brace shaft 322, described above. An arm rest pad 376 is attached to the upper end of the post 374 in a manner well known in the art.

Figure 32:
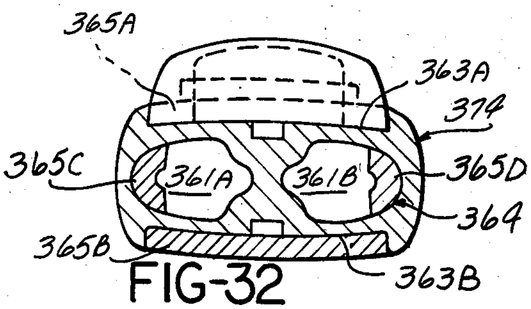
FIG. 32 is a sectional view taken along lines 32—32 of FIG. 10.

FIG. 32 illustrates, in a sectional view, an alternate interconnection structure for the arm rest posts 374 and the arm rest shaft 364. As described previously with respect to the leg and foot rest assemblies 234A and 234B, these elements of the arm rest assembly are interlaced with each other to permit relative movement therebetween but to add rigidity to the arm rest assembly. The arm rest post 374 is provided with two longitudinally extending apertures 361A and 361B. The arm rest post 374 is further provided with oppositely facing recesses 363A and 363B. The arm rest shaft 364 is provided with spaced apart extensions 365A and 365B movable through the recesses 363A and 363B. The arm rest shaft 364 is further provided with extensions 365C and 365D movably inserted into the aperatures 361A and 361B of the arm rest post 374. The arm rest is further provided with a release button similar to the release button 336 for the foot and leg rest assembly 234A described above.

The operation of the wheelchair 10 is illustrated in FIGS. 1 through 7. The wheelchair may be used in an open and upright condition, as shown in FIGS. 1, 2, 4, 5A and 5B to transport an occupant in an upright seating position. The handles 208A and 208B may be rotated to any convenient position for use by an individual pushing the wheelchair. The wheel base may be adjusted by use of the knob 44 to a convenient location for the occupant when the wheelchair is to be operated by the occupant. The seat back of the chair may be adjusted to a convenient and comfortable angle by rotation of the knob 172. The foot and leg rest assemblies 234A and 234B may be adjusted at several locations for the comfort and convenience of the occupant. For example, the struts 236 may be adjusted longitudinally relative to the side frames 14A amd 14B, the angle of the leg brace member 272 may be adjusted relative to the strut 236, and the location and angle of the foot rest pad 352 may be adjusted relative to the leg brace cushions 320. The foot and leg rest assemblies 234A and 234B may also be individually rotated out of the way or completely removed when the occupant does not desire or need them.

The arm rest assemblies 358 may be adjusted in height or may, if desired, be completely removed from the wheelchair. Removing the arm rest assemblies is particularly useful for removal of the occupant from the wheelchair to a toilet, a bed, or a car seat located adjacent to the one side of the wheelchair.

Furthermore, the wheelchair 10 may be easily folded for storage, as illustrated in FIGS. 2, 6 and 7. First, the seat base latch mechanism 128, the hinge 176 and the elbow member 248 must be disengaged. Then, the foot and leg rest assemblies 234A and 234B and the seat base assembly 120 must be rotated out of the way. Finally, the side frames 14A and 14B are brought together by the collapse of the scissor mechanism 16 and the folding of the seat back assembly 166. As the side frames 14A and 14B are brought together, the diagonal arm 496 guides the seat base assembly 120 to its folded vertical position.

Finally, the wheelchair 10 may be converted to a stretcher by lowering the seat back assembly 166 to its fully lowered position and raising each of the foot and leg rest assemblies 234A and 234B to their fully raised positions, as shown in phantom line in FIG. 3. In the stretcher position, the handles 208A and 208B are preferably rotated either towards the left or towards the right to facilitate manuvering of the wheelchair by an attendant. If desired, the large wheels 62 may be adjusted rearwardly while the wheelchair is in the stretcher position so as to improve the stability of the wheelchair.

FIGS. 31 and 39 through 57 illustrate several variations, modifications, and options which are useful with the wheelchair 10, according to the present invention.

Figure 39:
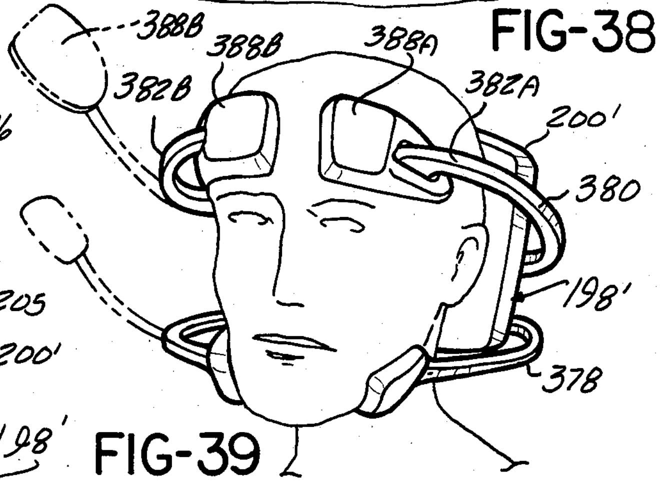
FIG. 39 is a partial front perspective view of an alternate head rest of the wheelchair of FIG. 1 and the head of an occupant, the ultimate head rest having a chin restraint assembly and a forehead restraint assembly illustrated in solid line in restraining positions, and illustrated in phantom line in non-restraining positions.
Figure 41:
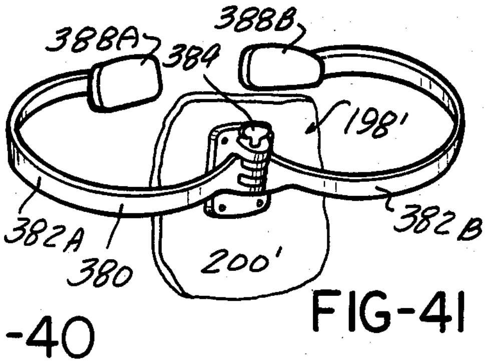
FIG. 41 is a partial rear perspective view thereof.

FIGS. 39 through 41 illustrate a modified head rest 198′ having a chin restraint assembly 378 and a forehead restraint assembly 380. Since the chin restraint assembly 378 and the forehead restraint assembly 380 are similar in construction, only the forehead restraint assembly 380 will be described in detail.

The forehead restraint assembly 380 has two arms 382A and 382B, each pivotally fastened to one side of the head rest frame 200′ by means of a locking pin 384 (FIG. 41). A forehead restraint pad 388A or 388B is pivotally mounted at the end of each arm 382A and 382B. Two covers formed of a resilient material, not shown in the drawing, may be provided, one being fitted over each of the arms 382A or 382B and the pad 388A or 388B associated with the arm to aesthetically complete the forehead restraint assembly 380. The locking pin 384 may be tightened to temporarily secure each of the arms 382A and 382B in an operative position adjacent to the head of the user. It will be appreciated by one skilled in the art that a head restraint may be provided with either a chin restraint assembly 378 alone, or a forehead restraint assembly 380 alone, or with both, as desired.

FIGS. 42 and 43 illustrate another alternative head rest 198″, according to the present invention. The head rest 198″ is provided with a sun visor 396 which is pivotally fastened by means of screws 392 and nuts 398 (FIG. 44) to the sides of the head rest frame 200′. The sun visor 396 is pivotable between a first position over the head of the occupant of the wheelchair (illustrated in solid line in FIGS. 42 and 43) and in a position away from the occupant of the wheelchair (as illustrated in phantom line in FIG. 43). The sun visor 396 is a dish-shaped article formed of a translucent material, such as Plexiglas®. Preferably, visor 396 is provided with a sun screening characteristic. The sun visor may be tinted or, preferably, may be polarized, as is well known in the art.

FIGS. 45 and 46 illustrate a restraint vest 400 which may be used in conjunction with the wheelchair 10. The vest is formed from two layers 402A and 402B of appropriate material, such as a woven polyester material, which have been cut to an appropriate shape and sewn together, as shown in the drawing. An intermediate layer (not shown in the drawing) may be provided to add extra comfort or warmth to the vest. The vest is provided with clips 404A and 404B interconnecting shoulder straps 406A through 406D to the occupant. Depending upon the occupant, the clips 404A and 404B may be designed to serve various functions. For example, if the occupant must be restrained in the wheelchair and may not be permitted to inadvertently or intentionally disconnect the clips 404A and 404B, they may be designed so that they can only be released by the attendant. On the other hand, and as illustrated, the clips 404A and 404B may be designed to be easily disengageable by the occupant of the wheelchair. The clips 404A and 404B, illustrated in the drawing, are similar to the quick disconnect fasteners used on parachutes and well known in the art.

A first belt 408 is interconnected by any appropriate means to the outer side of the seat back frame member 168A. The first belt 408 extends from the seat back frame member 168A around the front of the seat back cushion 188A through an aperture 412 (FIG. 45) in the outer layer 402A of one of the sides of the vest 400. The belt 408 extends from the aperture 412 across the back of the vest between the layers 402A and 402B and out through an aperture 414 in the outer layer 402A on the opposite side of the vest 400 from the aperture 412. The belt 408 extends from the aperture 414 across the front of the seat back cushion 188B and is fastened by any appropriate means to the seat back frame 168B. A second belt 416 is provided below the first belt 408 and extends from the seat back frame 168A through the vest 400 in a manner similar to the first belt 408 and is fastened at its opposite end to the other seat back frame 168B. Preferably, the first and second belts 408 and 416 are selectively disengageable from the seat back frame assemblies 168A and 168B so that the vest 400 may be easily removed therefrom and laundered.

The vest is further provided with a zipper 410 or another appropriate fastening means to close the front of the vest. As will be apparent to a man skilled in the art, the vest 400 may be used to secure an occupant to the wheelchair 10 in a far more comfortable and dignified manner than is possible with a seat belt or shoulder harness.

As shown in FIGS. 47, 48 and 49, the present invention provides various additional restraint devices for restraining an occupant to a wheelchair. FIG. 47 illustrates an example of a restraint brief 417 in an open condition. FIG. 48 illustrates a slightly modified restraint brief 417′ in a closed condition. The restraint brief 417 has a back portion 418 and a front portion 419 interconnected by a narrow crotch portion 420. The restraint brief 417′ differs from the restraint brief 417 only in that the front portion is separated into two portions 419A′ and 419B′. The two front portions 419A′ and 419B′ may be selectively interconnected by means of a Velcro® fastener 421.

The restraint briefs 417 and 417′ are provided with belts 422A and 422B, one being attached to each upper side of the back portion 418. Each belt 422A or 422B is provided at its end furthest from the restraint brief with a tongue 423. Each tongue 423 has an aperture 424 therethrough and is adapted, as is well known in the art, for selective interconnection with a female fastening buckle, as is commonly used in motor vehicles. The female buckles (not shown in the drawing) are interconnected by appropriate means to the seat base assembly or the seat back assembly of the wheelchair 10.

The other end of each of the belts 422A and 422B is provided with a conventional female fastening buckle 425A and 425B, respectively. The two tongues 423A and 423B are interconnected with the front portion 419 (or the front portions 419A′ and 419B′) of the restraint brief 417 (or 417′) at opposite corners. When an occupant is seated in the wheelchair 10, the restraint brief may be wrapped around his lower torso, in a manner similar to a diaper, and the tongues 423 may be interconnected with the buckles 425A and 425B to secure the occupant to the wheelchair 10. The Velcro® fastener 421 may be selectively disengaged to facilitate the occupant's use of toilet facilities.

FIG. 49 illustrates a belt-type restraint means 500 for the occupant of the wheelchair. The restraint means 500 has a pair of belts 502A and 502B extending from opposite sides of the seat back assembly or the seat base assembly. One end of each of the belts 502A and 502B is fastened to the seat base assembly or seat back assembly 166″ in any appropriate manner such as, for example, the anchoring device used for anchoring seat belts to the floor in motor vehicles. One of the belts 502A is provided with a female fastening buckle 504 selectively engageable with an apertured tongue (not illustrated) interconnected with the free end 506 of the other belt 502B such that, when the tongue is engaged in the female buckle, the belt extends across the waist of the occupant to secure the occupant to the wheelchair 10.

The restraint means 500 is further provided with two additional female fastening buckles 508A and 508B, each interconnected with each respective belt 502A or 502B at an intermediate location between the ends thereof. The restraint means 500 also has thigh restraints 510A and 510B. Each of the thigh restraints 510A and 510B is a loop of material defining an aperture 512 for selective insertion of one of the thighs of the occupant. Each of the thigh restraints is provided with a tongue selectively engageable with one of the female restraint buckles 508A or 508B.

As will be readily apparent to a man of ordinary skill in the art, the restraint briefs 417 and 417′ and the belt-type restraint means 500 are particularly suitable for restraining an occupant who is a single or double amputee.

FIGS. 50 through 52 illustrate a removable enclosure 426, according to the present invention, which may be used with the wheelchair 10. The enclosure 426 has a frame 428 which may be lowered onto the wheelchair 10. The frame 428 has two wheel housings 430A and 430B, one covering the top portion of each of the wheel mounting assemblies 24 (compare FIGS. 1 and 50 and FIG. 5A and 52).

Each of the wheel housings 430A and 430B is fastened to the wheel mounting frame 36 of the associated wheel mounting assembly 24 in an appropriate manner. The frame 428 further has a substantially flat back portion 432 extending between the wheel housings 430A and 430B and extending upwardly therefrom behind the seat back assembly 166 of the wheelchair 10. It should be noted that the back portion 432 limits the adjustment of the seat back assembly relative to the seat base assembly 120. If desired, however, the back portion 432 may be pivotally and adjustably mounted to the wheel housings 430A and 430B. Two U-shaped members 434A and 434B are securely fastened to the frame 428. The U-shaped members 434A and 434B have arms 433A and 435A, respectively, fastened to the wheel housing 430A and have arms 433B and 435B fastened to the wheel housing 430B. Tubular links 438A and 438B are pivotally fastened to intermediate locations along the arms 435A and 435B, respectively, of the U-shaped member 434B furthest from the back portion 432 of the frame 428. Another U-shaped member 440 is pivotally fastened at the end of each of its arms to free ends of the tubular links 438A and 438B. A handle 442A and 442B is fastened to each end of the U-shaped member 440.

A cover 444, fonmed of transparent material, is interconnected with the back portion 432 of the frame 428 and extends over the U-shaped members 434A, 434B, and 440. The cover 444 is fastened to each of the U-shaped members 434A, 434B, and 440 and to the tubular links 438A and 438B at appropriate locations in a manner similar to the manner in which a convertible top is fastened to its folding mechanism. The cover 444 may, if desired, be tinted or may be polarized in a manner well known in the art. The cover 444 may be provided with a window 448 to allow the occupant to better communicate and to pass objects into and out of the enclosure 426 without being exposed to rain or wind. The window 448 is zippered or otherwise fastened to the cover 444.

In operation, the cover is opened and closed by rotation of a handle 442 around the wheel housings 430A and 430B.

The enclosure 426 may also be provided with handles 446 fastened to the outside of the back portion 432 for control of the wheelchair by an attendant. It will be apparent to a man skilled in the art that the cover may be designed to completely enclose the occupant, for example, when the occupant needs an enhanced oxygen supply, by providing a cover that extends completely around the wheelchair, the cover being fastened, by means for example of a zipper (not shown), to completely seal off the interior of the enclosure 426 from the ambient atmosphere.

FIGS. 53 through 57 relate to an enclosure 614 for use with the wheelchair 10 when the wheelchair is opened into its stretcher position (compare FIG. 53 with FIG. 3 in phantom line). The enclosure 614 has a frame assembly 616 pivotally interconnected with the seat back frames 168A and 168B. The frame assembly 616 has four U-shaped members 615A through 615D, each pivotally fastened especially in FIG. 57, by means of a pivot pin 618 to a mounting bracket 617 at each end. Each mounting bracket 617 is mounted by means of screws 619 to one of the seat back frames 168A and 168B. A hinge 620 (FIGS. 54A and 54B) is provided between adjacent U-shaped members 615A through 615D to permit the frame assembly 616 to be folded, as shown in FIG. 54B, or to be locked in an open position, as shown in FIG. 54A. An arcuate guide 622 extends in a forward direction from the forward most U-shaped member 615D on either side of the frame assembly 616. A bolt 626 extends outwardly from each of the seat back frames 168A and 168B and passes through an arcuate aperture 624 in the adjacent guide 622. A wing nut 627 is threaded on the end of each bolt 626. The wing nut 627 may be selectively tightened on the bolt 626 to secure the frame assembly 616 to a closed position, illustrated in FIG. 54A. Shown in the drawing, the frame assembly 616 is further provided with a lower U-shaped member 628 extending behind the seat base assembly 166' between each of the pivot pins 618.

A cover 630 is stretched over the U-shaped members 615A through 615D and 628 of the frame assembly 616 in a manner similar to the cover 444 of the enclosure 426 described above. The cover 630 and frame assembly 616 together form an enclosure for the head and shoulders region of the stretcher so that the occupant is protected from the environment in this region. A plurality of Velcro ® fasteners 631 are provided along the forward most U-shaped member 615D of the frame assembly 616. A second cover 632, shown only in FIG. 53, may be selectively interconnected with the Velcro ® fasteners 631 so as to extend forward therefrom along the entire length of the wheelchair 10. The second cover 632 may be fastened to the wheelchair 10, for example, by means of appropriate additional Velcro ® fasteners 634 at various locations along the periphery of the second cover 632. Suitable fasteners (not shown) for interconnecting with the fasteners 634 on the second cover 632, are interconnected with various appropriate portions of the wheel 10, including the seat base frame 122, the foot and leg rest assemblies 234A and 234B and the seat back frame assemblies 168A and 168B. If desired, the covers 630 and 632 may form a single enclosure sealed around its entire periphery to the wheelchair. In that event, an appropriate breathing environment may be provided, as is well known in the art, for example, by use of an oxygen supplying device, not illustrated. The second cover 632 may also be provided with one or more windows 636 to allow an attendant or doctor to selectively reach into the enclosure 614.

FIG. 53 shows several additional devices and articles which may be used with the wheelchair 10 of the present invention when the wheelchair is to be used in its stretcher position. For example, as shown in FIG. 53, various necessary medical accessories, such as jar 522, may be fastened by appropriate manners well known in the art to one of the frames of the wheelchair 10. A harness 524 may be provided for securing the occupant in position in the wheelchair. The harness is generally in the form of two belts 526A and 526B, each having one end interconnected to the wheelchair 10. Each of the belts 526A and 526B has fastening means at its other end whereby the belts may be extended over a portion of the occupant and interconnected together to secure the occupant to the wheelchair 10. The former ends of the belts 526A and 526B may, for example, be selectively and movably engageable with the wheelchair 10 at the same fastening locations as the belts associated with the restraint vest 400 and restraint brief 417, described above, and may be substituted therefor when desired.

Figure 31:
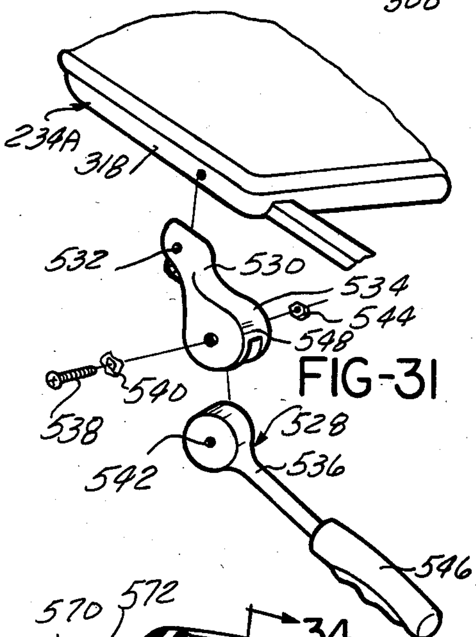
FIG. 31 is an exploded perspective view of one of the handles of the foot and leg rest assemblies of FIGS. 24 through 27.

FIGS. 3, 10, 31 and 53 also show an alternate handle 528 for the wheelchair. The handle 528 is provided to allow access to the handle when the wheelchair is used with the enclosure 426. Four handles 528 may be provided, one being fastened to each side of the seat back assembly 166 (as indicated in FIG. 53) and one being fastened to each of the foot and leg rest assemblies 234A and 234B (as shown in FIGS. 3, 10, and 31). As best shown in FIG. 31, each handle 528 has a handle brace 530 fastened, by means of screws 532 to the leg rest frame 318, for two of the handles, and as shown in FIG. 53, to the side of one of the seat back frames, for the other two handles. The handle brace 530 is provided with a yoke portion 534 accepting one end of a handle arm 536. The handle arm 536 is pivotally mounted to the yoke 534 by means of a screw 538 passed progressively through a washer 540, a suitable aperture of one arm of the yoke 534, an aperture 542 in the handle arm 536, and an aperture in the other arm of the yoke 534 and is fastened therebehind by means of a nut 544. A handgrip 546 formed of a suitable resilient material is fitted over one end of the handle arm 536 relative to the handle brace 530.

The handle arm 536 may be rotated to a functioning position where it is approximately parallel to the side frame or leg brace with which it is associated and is prevented from further upward rotation by an abutment 548. In this position, the four handles 528 facilitate the control and the lifting of wheelchair 10 by two attendants when the wheelchair is in the stretcher position. When not in use, the handles 528 may be rotated about the screw 538 downwardly to a storage position.

FIGS. 62 through 64 illustrate a second example of a wheelchair 10', constructed according to the present invention. Unlike the wheelchair 10, described above, the wheelchair 10' does not fold. Furthermore, the wheelchair 10' is provided with a spokeless wheel 452 having a large nonrotating hub, which will be described shortly. Finally, the wheelchair 10' has a modified main frame assembly 12', a modified leg and foot rest assembly 234', a modified arm rest assembly 358' and a modified head rest assembly 198'''.

The modified wheel assembly of the wheelchair 10' is illustrated in FIGS. 62, 63A, 65 and 66. The wheel mounting assembly 24' (FIGS. 62 and 63A) is similar to the wheel mounting assembly 24, (FIG. 3) described above with the reference to the wheelchair 10, except that a wheel hub 454 is rigidly fastened to the triangular flange 28 (FIG. 15) of the wheel mounting assembly 24' and the control knob for the wheel adjustment is provided on the outside of the wheelchair. Since the hub 454 does not rotate, the load experienced by the hub 454 is always in the same direction. Therefore, the hub only needs strength to support the load of the wheelchair 10' in one angular position of the hub 454. The hub 454 in the example illustrated provides sufficient support by use of a pair of mating wheel inserts 458A and 458B (FIGS. 65 and 66), similar to the inserts 66A and 66B (FIG. 10) for the wheel 62 but having a shape similar to the Greek letter "Pi". The inserts may, however, have a conventional spoke-like appearance, if desired.

The inserts are fitted together to form a first rim 456. The rim 456 is C-shaped in cross section and defines a circumferentially located raceway for a series of roller bearings 462. An insert 457 may be provided within the first rim 456 to provide a bearing surface for the roller bearings. Preferably, the roller bearings 462 are linked together to form a continuous chain of bearings around the rim 456. An example of a chain of roller bearings which would be appropriate for this use is disclosed in the Thomson Industries Catalog, Form 5157/81 entitled "Roundway Bearings and Ways" and is published by the Thomson Industries, Inc. of Manhasset, N.Y. 11030. A second or outer rim 464 is fitted into the first rim 456 and rests on the bearings 462. A hand wheel 466 (FIG. 66) is attached to a cylindrical flange 468 extending from the outer rim 464. A tire 470 is provided in the outer rim 464. In operation, therefore, the outer rim 464, the hand wheel 466, and the tire 470 may rotate freely around the hub 454.

The load of the wheelchair and the occupant is transferred downwardly from the wheelchair frame 14' to the inserts 458A and 458B to the first rim 456 and, finally, through the roller bearings 462, to the outer rim 464 and the tire 470. The operator may propel the wheelchair 10' in a conventional manner by rotating the hand wheel 466. If desired, a polyurethane handgrip may be attached, for example, by means of a two-sided adhesive strip, to the inside of the hand wheel 466 to make it more comfortable for the user. Alternately and as illustrated, the handgrip described above may be used.

The main frame assembly 12' and the side frames 14A' and 14B' of the wheelchair 10' are constructed from fewer elements than the main frame assembly 12 and the side frames 14A and 14B of the wheelchair 10, described above, since the wheelchair 10 is not collapsible. The side frames 14A' and 14B' consist of a single structural element extending forwardly and downwardly from each of the wheel mounting assemblies 24' and are interconnected together at their lowermost end, as best shown at 640 in FIG. 64. The seat base frame 122' may be rigidly fastened to each of the side frame portions 14A' and 14B'.

As can be seen in FIGS. 63B and 64, the main frame assembly 12' and the seat base frame 122' are proportioned such that the wheelchair may be backed over a water closet 476. The seat base frame 122' has a removable center insert 140' similar to the center insert 140, described above, which may be removed when the occupant of the wheelchair needs to use the water closet 476. As shown in FIG. 63B, the wheelchair 10' may be used in conjunction with a flexible sheet 162' similar to the sheet 162 described previously except for the provision of an aperture 163' therethrough. The sheet 162' protects the seat cushion from stains.

As shown in FIG. 63A, the head rest assembly 198''' of the wheelchair 10' has a frame 204' and cushion 206' mounted at the upper end of a support member 202'. The lower end of the support member 202' is movably interconnected with the front side of the seat back frame 168' between the frame 168' and the seat back cushion 188' in a manner well known in the art. The head rest may be retracted downwardly into a cavity 642 in the seat back assembly.

FIGS. 67 and 68 show an alternate caster assembly 94' which may be used with the wheelchair 10 or the wheelchair 10' of the present invention. A caster frame 482 is mounted to the lower end of the side frame 14' by means of a pin 484 and pivots about the pin. A swing arm 486 is mounted by means of a pin 488 to the caster frame 482 and pivots about the pin. The swing arm 486 is a U-shaped member having two L-shaped arms 490A and 490B interconnected by a base portion 492. The caster frame 482 is provided with an extension 494 which cooperates with the base portion 492 of the swing arm 486 to limit the rotation of the swing arm. The wheels 114′ are interconnected with the swing arm by means of an axle 116′ passing through apertures 496A in the wheels and apertures 497 in the elbows of each of the arms 490A and 490B. The swing arm 486 assists the caster assembly 94′ in absorbing shocks resulting from uneven pavement. Shock-absorbing means may be provided between the swing arm 486 and the caster frame 482. In the example illustrated, a roller 498 formed of resilient material is operably disposed between the swing arm 486 and the caster frame 482 to absorb the shocks resulting from uneven pavement.

FIGS. 69 through 73 generally illustrate an alternate collapsible arm rest 358′ installed on the wheelchair 10′ of the present invention. The arm rest 358′ has a lower frame member 550 fastened in any appropriate manner to the seat base frame 122′. As best depicted in FIG. 69, but as also shown in FIGS. 72 and 73, the frame member 550 is a thin elongated member having a U-shaped cross-section and forming an upwardly oriented channel 552. One side of the channel 552 is provided with a series of vertical indentations or detents 554. A guide member 556 is slidably disposed in the channel 552. A button 558 is slidably interconnected with the guide member 556. The button 558 is provided with a downwardly extending flange 560 engageable with the detents 554 to lock the guide member 556 and is positioned along the channel 552. The guide member 556 is further provided with an internal aperture accepting a spring 564 whereby, the spring 564 biases the button into engagement with the detents. The button may be manually disengaged from the detents by pressing on a button face 565.

An upper frame member 550′ similar to the lower frame member 550 is also provided. A guide member 556′ is also provided in the channel of the upper frame member 550′ having a similar button 558′ and spring 564′. An arm rest cushion 563 is fastened by any appropriate means to the upper side of the upper frame member 550′.

As shown in FIGS. 69, 70A, and 70B, two elongated arm rest cross members 566A and 566B are provided between the upper and lower frame members. Each of the cross members 566A and 566B are pivotally fastened at one end of its ends to one of the frame members 550 or 550′, and pivotally fastened at the other of its ends to the guide member 556′ or 556 associated with the opposite frame member and the two supports are pivotally fastened together at their respective midpoints by a pin 561 to form a collapsible support for the upper frame member.

A sheathed cable 568 extends between the upper button 558′ and the lower button 558, the upper end of the inner cable of the sheathed cable 568 is passed through a suitable aperture into the guide member 556′ on the same side of the guide as the button and is fastened therebehind to the portion of the button on the far side of the guide. The aperture is proportioned so as not to permit the sheathing of the cable to pass therethrough. The other end of the inner cable of the sheathed cable 568 is passed through a similar aperture through the lower guide member 556 but on the side of the lower guide member furthest from the button face. This end of the cable is also fastened to the button.

It is readily apparent that the operator may manually disengage both of the buttons 558 and 558′ from their respective detents by manually depressing either one of the buttons, since the cable 568 is advanced along its sheathing by depressing either of the buttons.

FIGS. 74 and 75A and 75B illustrate further modifications for the arm rest assembly 358″ and the further modified arm rest assembly 358″, an arm rest pad 650 is pivotally mounted to the top of the upper frame member 550′, for example, by a pair of spaced apart hinges 52A and 52B so that the arm rest pad may be pivoted to a functional position, as illustrated in FIGS. 75A or, alternately, to a storage position, illustrated in FIG. 75B, to further reduce the height of the collapsed arm rest assembly 358″. The arm rest pad 650 may, for example, be constructed of a flat frame member and a cushion surrounded by fabric, as is well known in the art. A brace member 654 is pivotally fastened to the lower side of the arm rest pad 650 for selectively securing the arm rest pad in its functioning position. For example, and as illustrated, the frame of the arm rest pad 650 may be constructed of a resilient material with the brace member 654 formed of the same material, whereby the brace member 654 may be selectively pivoted upwardly, as shown by the arrow 656 in FIG. 74 to selectively disengage the brace member from the upper frame member 550′ of the arm rest assembly 358″.

FIGS. 76 through 79 illustrate still another modified wheel assembly 658 for the wheelchair 10 or the wheelchair 10′ of the present invention. The wheel assembly 658 is particularly useful for a spokeless wheel arrangement as that described with respect to the wheelchair 10′. The wheel assembly 658 is provided with a rim 660 conventionally interconnected with a tire 662. The rim is provided with an inwardly oriented track 664 consisting of a ridge having a semi-ovoid cross-section. The wheel assembly further is provided with wheel inserts 666A and 666B together defining a hub for the wheel assembly 658. A fender 668 is interconnected with, in a conventional and convenient manner, corners fonmed together with the inner insert 666A. The inserts illustrated define a hub having a generally triangular shape but, as will be apparent to a man skilled in the art, may have any convenient shape and include many aesthetically pleasing variations. The inserts 666A and 666B may be formed of a graphite material and can be provided with a plurality of strengthening ribs 665 (FIG. 77). The inserts may further be interconnected in a manner similar to the interconnection of the outer and inner side frame components 13 and 15, respectively, of the side frames 14A and 14B, described earlier. The inner insert 666A is further provided with three mounting platforms 670A, 670B, and 670C, each extending outwardly from the main portion of the insert 666A so as to be substantially parallel to a portion of the track 664 of the rim 660 adjacent to the respective platform.

It may readily be appreciated, therefore, that the wheel assembly 658 provides an efficient three-point bearing system for a wheel which provides a design with flexibility to provide an aesthetically pleasing wheel design.

A roller assembly 672A, 672B, and 672C is provided for each of the platforms 670A, 670B, and 670C, respectively, for cooperation with the track 664. The upper roller assemblies 672A and 672B, which are approximately the same height above the ground, are illustrated in FIG. 78. Each roller assembly 672A or 672B is provided with a flat rectangular shock absorber 674 and a mounting block 676, both being secured to the platform 670A by, for example, screws (not shown). An ovoid hub element 678 is fixedly secured to the mounting block 676. A roller chain 680, similar to the chain of roller bearings 462, described earlier but having fewer rollers, is provided around the ovoid hub element 678 and cooperates with the track 664 to provide a bearing between the insert 666A and the rim 660. The roller assembly 672C provided on the lower platform 670C is similar to the roller assembly 672A and 672B, described above, except that two roller chains 680A and 680B are provided for cooperating with the track 664. The mounting block 682, as illustrated in FIG. 79, is Y-shaped and provided with two ovoid hub members 684A and 684B, each provided at approximately 45-degree angles from the central plane of the rim 660. The two roller chains 680A and 680B are provided for the lower platform 670C because most of the load of the wheelchair is experienced by this roller assembly.

Examples of suitable roller assemblies 672A, 672B, and 672C may be found in the Thomson Catalog, referred to earlier.

The wheelchairs 10 and 10′ of the present invention have a modular construction. The modular construction of the wheelchair of the present invention lends itself to providing wheelchair components which are interchangeable so that, in response to the specific needs of specific wheelchair users, the wheelchair may be assembled from individual subassemblies to meet those needs. For example, a wheelchair user may specify a collapsible or non-collapsible wheelchair, a spokeless or spoked wheel, a collapsible arm rest or affixed arm rest, an adjustable or affixed leg rest or no leg rest at all, a one piece seat base assembly or a seat base assembly with a removable insert. Additionally, various main frame assemblies and wheel inserts may be offered to provide wheelchairs having different ornamental appearances.

The above description of the present invention is by way of example and not by way of limitation. It is possible to construct wheelchairs according to the present invention, incorporating some of the features described above and using conventional components elsewhere. Furthermore it will be apparent to a man skilled in the art, that modifications and variations may be made within the scope of the present invention to the individual features described above. Such modifications are within contemplation of the inventor and within the scope of the claims appended hereto.

What is claimed as novel is as follows:

1. A transport vehicle for transporting an occupant, said transport vehicle comprising:

a pair of spaced apart side frame assemblies disposed in a spaced apart parallel relationship, each of said pair of side frame assemblies having a front wheel mounting means and a rear wheel mounting means, said rear wheel mounting means comprising:

a wheel mounting member movably interconnected with a respective side frame assembly of said pair of side frame assemblies; and wheel adjustment means operably disposed between said wheel mounting member and said respective side frame assembly, said wheel adjustment means selectively operable to move said wheel mounting member horizontally relative to said respective side frame assembly;

a pair of caster wheels, each of said pair of caster wheels connected with one of said front wheel mounting means;

a pair of drive wheels, each of said drive wheels having a hub member, a wheel member, a means for slidably connecting said wheel member to said hub member, said hub member fixedly secured to said wheel mounting member of said wheel mounting means of said pair of side frame assemblies, said means for slidably connecting said wheel member interposed said wheel member and said hub member such that said wheel member may rotate relative to said hub member;

a seat base assembly interposed each of said pair of said side frame assemblies;

fastening means for interconnecting said seat base assembly with said pair of side frame assemblies; and a seat back assembly having an upper end and a lower end, said seat back assembly being interconnected at said lower end of said seat back assembly to each of said pair of side frame assemblies.

2. The transport vehicle of claim 1 further comprising a linkage extending between said pair of side frame assemblies, said linkage comprising a first link member pivotally fastened to one of said pair of side frame assembly and slidably fastened to an other of said pair of side frame assemblies and a second link member pivotally fastened to said other of said pair of side frame assemblies and slidably fastened to said one of said pair of side frame assemblies and means for pivotally interconnecting said first link member with said second link member midway between each of said pair of side frame assemblies.

3. The transport vehicle of claim 1 wherein said means for slidably connecting said wheel member to said hub member comprises a rim affixed to said hub member, a channel disposed around said rim of said hub member, and bearing means disposed along said channel, said wheel member disposed within said channel and slidable along said bearing means within said channel such that said wheel member may rotate relative to said hub member.

4. The transport vehicle of claim 1 further comprising:

a head rest mounted to said seat back assembly and extending upwardly therefrom;

a head restraint means movably interconnected with said head rest; and actuation means operably interconnected between said head restraint means and said head rest, said actuation means being selectively operable to move said head restraint means from an inoperative position to an operative position.

5. The transport vehicle of claim 1 further comprising:

head rest mounted to said seat back assembly and extending upwardly therefrom;

a visor comprised of a transparent material; and

Pivotal mounting means for pivotally mounting said visor, said pivotal mounting means being pivotable between an inoperative position and an operative position.

6. The transport vehicle of claim 1 further comprising a cloth toso restraint member, fastening means for fastening said cloth torso restraint member around the torso of an occupant of said transport vehicle, four shoulder straps extending from said torso restraint member, fastening means for interconnecting pairs of said four shoulder straps over the shoulders of the occupant, and a flexible belt interposed said seat back assembly and said torso restraint member.

7. The transport vehicle of claim 1 further comprising:

a cloth seat restraint member having a front portion, a rear portion and an intermediate portion interconnecting said front and rear portions, said front portion having a pair of sides, said rear portion having a pair of sides;

first fastening means on both of said pair of sides of said rear portion;

second fastening means on both of said pair of sides of said front portion selectively engageable with said first fastening means when said restraint member is located on the occupant in the manner of a diaper; and at least one belt having two ends and being interconnected at one of said two ends with said restraint member and the other of said two ends interconnected with said transport vehicle.

8. The transport vehicle of claim 1 further comprising:

two first belt members each having two ends and each having one of said two ends interconnected with said transport vehicle;

first selectively engageable belt interconnection means at the other end of each of said two first belt members, said first belt interconnection means being selectively engageable when said two first belt members are stretched around the waist of the occupant;

two second belt members each having a loop portion for accepting therethrough one of the legs of the occupant; and second interconnection means interconnecting each of said two second belt members with a respective one of said first belt members.

9. The transport vehicle of claim 1 further comprising a removable cover assembly, said cover assembly comprising a cover support assembly removably interconnected with each of said pair of side frame assemblies and extending therebetween at a predetermined distance above said seat base assembly and said seat back assembly and a flexible transparent cover fitted over said cover support assembly and interconnected therewith.

10. The transport vehicle of claim 1 wherein said seat base assembly comprises a seat base main frame and a centrally and forwardly located seat insert removably secured to said seat base main frame such that, when said seat insert is selectively removed from said seat base assembly, said seat base assembly has an aperture suitable for personal hygienic use.

11. The transport vehicle of claim 10 further comprising a portable toilet selectively insertable in said aperture in said seat base main frame assembly.

12. The transport vehicle of claim 10 further comprising a flexible water-retaining selectively placeable over said seat base assembly so that, upon removal of said seat insert, a portion of said flexible insert extends downwardly through said aperture to form a toilet.

13. The transport vehicle of claim 10 wherein each of said pair of side frame assemblies and said seat back assembly are proportioned such that said transport vehicle may be selectively moved over a water closet and whereby, said water closet may be used by the occupant of the transport vehicle when said seat insert is removed.

14. The transport vehicle of claim 1 further comprising selectively operable brake means movably interconnected with at least one of said pair of side frame assemblies and having a wheel engaging means selectively operable to frictionally engage a portion of one of said pair of drive wheels so as to inhibit rotation of one of said pair of drive wheels.

15. The transport vehicle of claim 1 further comprising selectively operable brake means interconnected with at least one of said pair of side frame assemblies and having a wheel engaging means selectively operable to interlockingly engage with a portion of one of said pair of drive wheels so as to prohibit rotation of said one of said pair of drive wheels.

16. The transport vehicle of claim 1 further comprising seat back adjustment means operably disposed between said seat back assembly and one of said pair of side frame assemblies for selectively adjusting the pivotal position of said seat back assembly relative to said pair of side frame assemblies.

17. The transport vehicle of claim 1 further comprising two arm rests, each adjustably fastened to one of said pair of side frame assemblies so that said two arm rest may be selectively raised and lowered relative to said pair of side frame assemblies.

18. The transport vehicle of claim 1 further comprising two foot rest assemblies each removably interconnected with one of said pair of side frame assemblies.

19. The transport vehicle of claim 1 further comprising two leg rest assemblies each pivotally fastened to one of said pair of side frame assemblies so that each of said two leg rest assemblies is pivotal about an axis parallel to the ground to selectively raise and lower each of said two leg rest assemblies.

20. The transport vehicle of claim 19 wherein said two leg rest assemblies and said seat back assemblies are pivotable to be coplaner with said seat base assembly to form a stretcher.

21. The transport vehicle of claim 1 wherein said seat base assembly comprises a seat base frame and a cushion fitted onto said seat base frame; and wherein said seat back assembly comprises a seat back frame and a cushion fitted onto said seat back frame.

22. The transport vehicle of claim 1 further comprising at least one handle movably interconnected with the seat back assembly and selectively disengageable interlocking means selectively operable to prevent movement of said at least one handle relative to said seat back assembly.

23. The transport vehicle of claim 22 wherein said selectively disengageable interlocking means comprises a first interlocking member extending from said at least one handle, a second interlocking member engageable with said first interlocking member to prevent movement of said at least one handle relative to said seat back assembly and spring means operably disposed between said seat back assembly and said second interlocking member, biasing said second interlocking member into engagement with said first interlocking member so that said at least one handle may be moved relative to said seat back assembly by application of a predetermined force to said at least one handle thereby overcoming the biasing affected by said spring means.

24. The transport vehicle of claim 1 wherein said hub member comprises a central portion; a plurality of arm portions extending radially from said central portion, each of said plurality of arm portions having a radial end; and bearing means disposed at said radial end of each of said plurality of arm portions movably engaging said rear wheel.

25. The transport vehicle of claim 1 further comprising a hand wheel interconnected with each of said pair of drive wheels, said hand wheel having a plurality of handgrip indentations extending around approximately one-third of the circumference of said hand wheel.

26. The transport vehicle of claim 25 wherein each of said plurality of handgrip indentations is proportioned to accept the index finger of the occupant of the transport vehicle and further wherein each of said plurality of handgrip indentations is separated by ridges having a thickness approximately equivalent to the spacing between the index finger and the adjacent finger of the occupant when the occupant's hand is in an unstressed gripping condition.

27. The transport vehicle of claim 1 further comprising a pair of leg rests, each of said pair of leg rests comprising:

a longitudinally extending first member having a first end and a second end, said first end of said first member being interconnected with said seat base assembly, said second end of said first member extending forwardly therefrom;

a longitudinally extending second member having a first end and a second end, said first end of said second member being pivotally fastened to said second end of said longitudinally extending first member;

a longitudinally extending third member having a first end and a second end, said first end of said third member being movably interconnected with said second end of said second member;

a foot rest interconnected with said second end of said third member; and selectively disengageable interlocking means operably disposed between said third member and said second member to prevent relative motion therebetween.

28. The transport vehicle of claim 27 wherein said first member is movably and removably interconnected with said seat base assembly and wherein each of said pair of leg rests further comprises selectively disengageable interlocking means to prevent relative movement between said first member and said seat base assembly and for preventing separation of said first member and said seat base assembly.

29. The transport vehicle of claim 27 wherein said second member is pivotally mounted to said first member so as to pivot about an axis parallel to the ground and wherein said second member is pivotable relative to said first member between a first position wherein said foot rest is a predetermined distance above the ground and a second position wherein said foot rest is a second and larger predetermined distance above the ground, and wherein said leg rest further comprises spring means operably disposed between said second member and said first member; said spring means biasing said second member towards said second position and selectively disengageable interlocking means operably disposed between said first member and said second member for selectively preventing rotation of said second member relative to said first member.

30. The transport vehicle of claim 27 further comprising an elbow member interposed between said second member and said first member, said elbow member being pivotally fastened to said first member and said second member being pivotally fastened to said elbow member so that said second member may be pivoted about two different axes relative to said first member, one of said axes being parallel to the ground and the other of said axes being colinear with said second member.

31. The transport vehicle of claim 27 wherein said selectively disengageable interlocking means between said second and said third members comprises a first interlocking means on one of said members, a second interlocking means pivotally fastened to the other of said members and engageable with said first interlocking means, and spring means biasing said second interlocking means into engagement with said first interlocking means, said selectively disengageable interlocking means being selectively disengageable by exertion of a force on said second interlocking means to overcome the force of said spring means and, thereby, to pivot said second interlocking means away from engagement with said first interlocking means.

32. In a wheeled transport vehicle intended for transporting a human occupant and provided with a seat base and a seat back, operably interconnected with two rear drive wheels and two front casters, the improvement comprising:

two side frames, each being interconnected with said seat base;

two wheel mounting members, each movably interconnected with one of said two side frames;

wheel adjustment means for each of said two wheel mounting member operably disposed between each of said two side frames and an associated wheel mounting member of said two wheel mounting members; and drive means selectively operable to activate said wheel adjustment means for moving said two side frames and said seat base forward or backwards on a horizontal plane, said two side frames and said seat base moving relative to said two rear drive wheels; each of said two rear drive wheels mounted to one of said two wheel mounting members.

33. The wheeled transport vehicle of claim 32 wherein said each of said two side frames has a horizontally disposed track and wherein each of said two wheel mounting members is movably interconnected with said track.

34. The wheeled transport vehicle of claim 33 wherein said wheel adjustment means comprises a rack fixedly secured to each of said two side frames and a gear interconnected with a respective mounting member of said two wheel mounting members, said gear engaging said rack and further wherein said drive means is operably interconnected with said gear to rotate said gear such that operation of said drive means causes said gear to rotate and to, thereby, translate along said rack.

35. The wheeled transport vehicle of claim 32, wherein each of said two wheel mounting members comprises:

a hub member fixedly secured to said associated wheel mounting member; and means for slidably connecting each of said two rear drive wheels to said hub member interposed each of said two rear drive wheels and said hub member such that said two rear drive wheels may rotate relative to said hub member.

* * * * *

UNITED STATES PATENT AND TRADEMARK OFFICE

CERTIFICATE OF CORRECTION

PATENT NO. : 4,593,929

DATED : June 10, 1986

INVENTOR(S) : Ronald Henry Williams

It is certified that error appears in the above-identified patent and that said Letters Patent is hereby corrected as shown below:

Column 1, line 4, delete "however" and insert -- However --.

Column 5, line 16, after "needed" insert a period --.--.

Column 18, line 43, delete "wlth" and insert -- with --.

Column 23, line 35, delete "fonmed" and insert -- formed --.

Column 30, line 65, delete "toso" and insert -- torso --.

Signed and Sealed this

*Thirtieth* Day of *September 1986*

[SEAL]

*Attest:*

DONALD J. QUIGG

*Attesting Officer* *Commissioner of Patents and Trademarks*

UNITED STATES PATENT AND TRADEMARK OFFICE
CERTIFICATE OF CORRECTION

PATENT NO. :4,593,929

DATED :June 10, 1986

INVENTOR(S) :Ronald Williams

It is certified that error appears in the above-identified patent and that said Letters Patent is hereby corrected as shown below:

Column 1, line 41, after "and" insert ----inexpensive----.

Column 2, line 6, delete " folds " and insert ---- fold ----.

Column 5, line 17, after " rests " second occurrence insert ---- head ----.

Column 10, line 68, delete " composit " and insert ---- composite ----.

Column 11, line 30, delete " approximately " and insert ---- approximate ----.

Column 17, line 23, delete "rear" and insert ---rearwardly--

Column 19, line 57, delete "aperatures " and insert ---- apertures ----.

Column 21, line 16, after " Perferably " insert ---- the sun ----.

Column 25, line 68, delete " cross section" and insert ---- cross-section ----.

UNITED STATES PATENT AND TRADEMARK OFFICE

CERTIFICATE OF CORRECTION

PATENT NO. : 4,593,929

DATED : June 10, 1986

INVENTOR(S) : Ronald Williams

It is certified that error appears in the above-identified patent and that said Letters Patent is hereby corrected as shown below:

Column 28, line 42, delete " fonmed " and insert ---- formed ----.

Column 29, line 46, after " Furthermore " insert a comma ---- , ----.

Column 30, line 60 delete " Pivotal " and insert ---- pivotal ----.

Column 31, line 60, after " water-retaining " insert ---- insert ----.

Column 32, line 26, delete " rest " and insert ---- rests ----.

Signed and Sealed this

Eighteenth Day of November, 1986

*Attest:*

DONALD J. QUIGG

*Attesting Officer* *Commissioner of Patents and Trademarks*

UNITED STATES PATENT AND TRADEMARK OFFICE

CERTIFICATE OF CORRECTION

PATENT NO. : 4,593,929

DATED : June 10, 1986

INVENTOR(S) : Ronald H. Williams

It is certified that error appears in the above-identified patent and that said Letters Patent is hereby corrected as shown below:

Column 1, line 41, delete "however" and insert -- However --.

Column 5, line 16, after "needed" insert a period --.--.

Column 18, line 43, delete "wlth" and insert -- with --.

Column 23, line 35, delete "fonmed" and insert -- formed --.

Column 30, line 65, delete "toso" and insert -- torso --.

This certificate supersedes Certificate of Correction issued September 30, 1986.

Signed and Sealed this

Third Day of February, 1987

*Attest:*

DONALD J. QUIGG

*Attesting Officer*

*Commissioner of Patents and Trademarks*